US008765854B2

(12) United States Patent
Ikeda et al.

(10) Patent No.: US 8,765,854 B2
(45) Date of Patent: *Jul. 1, 2014

(54) ETHYLENE-VINYL ALCOHOL COPOLYMER RESIN COMPOSITION OF LOW CARBOXYLIC ACID CONTENT

(75) Inventors: Kaoru Ikeda, Kurashiki (JP); Noriyuki Kida, Kurashiki (JP); Hiroyuki Shindome, Kurashiki (JP); Naohiko Uchiumi, Okayama (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/393,666

(22) Filed: Feb. 26, 2009

(65) Prior Publication Data

US 2009/0326124 A1 Dec. 31, 2009

Related U.S. Application Data

(63) Continuation of application No. 10/503,723, filed as application No. PCT/JP03/01208 on Feb. 6, 2003, now Pat. No. 7,524,895.

(30) Foreign Application Priority Data

| Feb. 18, 2002 | (JP) | 2002-040651 |
| Oct. 29, 2002 | (JP) | 2002-314560 |
| Dec. 25, 2002 | (JP) | 2002-375379 |

(51) Int. Cl.
*C08K 3/24* (2006.01)
*C08K 3/32* (2006.01)
*C08K 3/38* (2006.01)

(52) U.S. Cl.
USPC ............ 524/405; 524/183; 524/401; 524/404; 524/417

(58) Field of Classification Search
USPC ................. 524/183, 404, 405, 417, 401
See application file for complete search history.

(56) References Cited

U.S. PATENT DOCUMENTS

| 4,904,723 | A | 2/1990 | Uemura et al. | |
| 5,665,742 | A | 9/1997 | Mori et al. | |
| 6,174,949 | B1 | 1/2001 | Ninomiya et al. | |
| 6,184,288 | B1 * | 2/2001 | Ninomiya et al. | 525/61 |
| 6,184,388 | B1 | 2/2001 | Takemura et al. | |
| 6,372,359 | B1 * | 4/2002 | Hayashi et al. | 428/518 |
| 6,395,358 | B1 * | 5/2002 | Tai et al. | 428/36.7 |
| 6,538,064 | B2 * | 3/2003 | Kawahara et al. | 525/61 |
| 6,613,833 | B2 * | 9/2003 | Kawahara et al. | 524/557 |
| 6,686,405 | B1 * | 2/2004 | Kawahara et al. | 524/127 |
| 6,838,029 | B2 * | 1/2005 | Kawahara et al. | 264/141 |
| 6,921,790 | B2 | 7/2005 | Nakano et al. | |
| 6,953,827 | B2 | 10/2005 | Hara et al. | |
| 6,964,990 | B2 | 11/2005 | Kazeto et al. | |
| 7,473,735 | B2 | 1/2009 | Uchiumi et al. | |
| 2003/0060550 | A1 | 3/2003 | Inomata et al. | |
| 2004/0072922 | A1 | 4/2004 | Hossainy et al. | |
| 2005/0038163 | A1 | 2/2005 | Shindome et al. | |
| 2005/0186374 | A1 | 8/2005 | Nakano et al. | |

FOREIGN PATENT DOCUMENTS

| CA | 2 249 118 C | 2/2003 |
| EP | 0 386 720 A1 | 9/1990 |
| EP | 0 814 125 A2 | 12/1997 |
| EP | 0 814 125 A3 | 12/1997 |
| EP | 0 930 339 A1 | 7/1999 |
| EP | 0 990 513 A1 | 4/2000 |
| EP | 1 090 953 | 4/2001 |
| JP | 1-135852 | 5/1989 |
| JP | 11-35774 | 2/1999 |
| JP | 11-116760 | 4/1999 |
| JP | 2000-43040 | 2/2000 |
| JP | 2000-102918 | 4/2000 |
| JP | 2000-281715 A | 10/2000 |
| JP | 2001-11191 | 1/2001 |
| JP | 2001-164059 | 6/2001 |
| WO | 2004/009313 | 1/2004 |

OTHER PUBLICATIONS

U.S. Appl. No. 12/393,532, filed Feb. 26, 2009, Ikeda, et al.
Extended Search Report issued Dec. 2, 2010 in Europe Application No. 10010098.1.
Extended Search Report issued Nov. 19, 2010 in Europe Application No. 10010099.9.
Canadian Office Action Issued May 30, 2012 in Patent Application No. 2,723,081.
Japanese Office Action issued Feb. 26, 2013 in Patent Application No. 2008-122694 with English Translation.

* cited by examiner

*Primary Examiner* — David W Wu
*Assistant Examiner* — Marie Reddick
(74) *Attorney, Agent, or Firm* — Oblon, Spivak, McClelland, Maier & Neustadt, L.L.P.

(57) ABSTRACT

An ethylene-vinyl alcohol copolymer resin having low odor of acetic acid and good long-run workability is provided. The ethylene-vinyl alcohol copolymer resin which contains an alkali metal salt (A) and has a very low extractable carboxylate content is obtained by a method including contacting the ethylene-vinyl alcohol copolymer resin with an aqueous solution containing carbon dioxide gas.

11 Claims, 1 Drawing Sheet

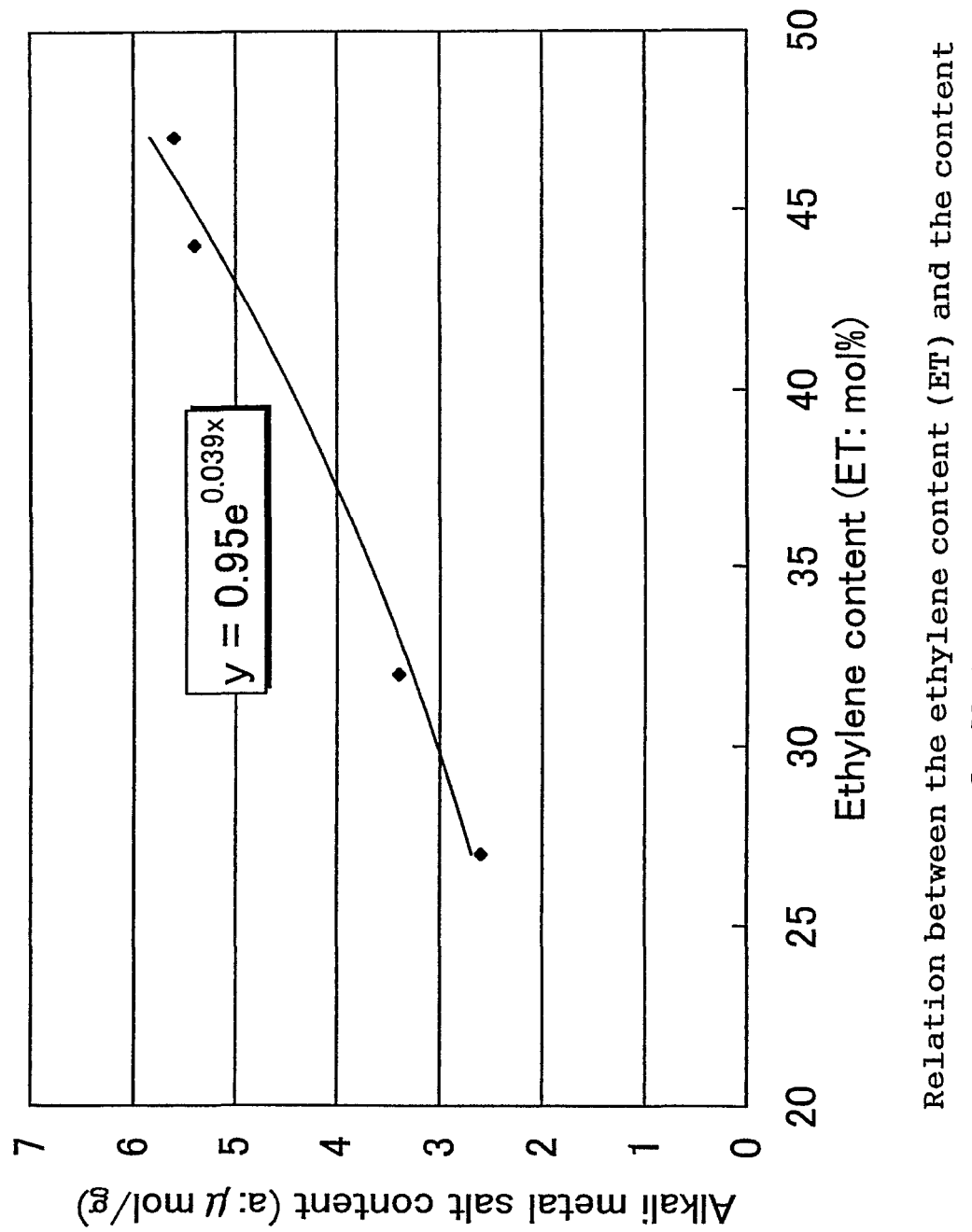

# ETHYLENE-VINYL ALCOHOL COPOLYMER RESIN COMPOSITION OF LOW CARBOXYLIC ACID CONTENT

CROSS REFERENCE TO RELATED APPLICATIONS

This application is a continuation application of prior U.S. application Ser. No. 10/503,723, filed Aug. 6, 2004, which is the National stage of PCT/JP03/01208, filed Feb. 6, 2003, the disclosures of which are incorporated herein by reference in their entireties. The parent application claims priority to Japanese Application Nos. 2002-040651, filed Feb. 18, 2002, 2002-314560, filed Oct. 29, 2002, and 2002-375379, filed Dec. 25, 2002, the disclosures of which are incorporated herein by reference in their entireties.

BACKGROUND OF THE INVENTION

1. Technical Field

The present invention relates to a method for producing an ethylene-vinyl alcohol copolymer resin composition and to a method for producing a pellet of an ethylene-vinyl alcohol copolymer resin composition. In addition, the invention relates to an ethylene-vinyl alcohol copolymer resin composition and ethylene-vinyl alcohol copolymer resin composition pellets made thereof. Moreover, the invention relates to melt-molded articles made of an ethylene-vinyl alcohol copolymer resin composition.

2. Description of the Background

Ethylene-vinyl alcohol copolymer, which may henceforth be abbreviated as EVOH, is a useful macromolecular material superior in oxygen barrier property, oil resistance, antistatic property, mechanical strength and the like, and is in wide use as various types of packaging material such as films, sheets and containers. Although EVOH pellets are molded into various molded article by various methods, they are often melt-molded by, for example, extrusion molding or injection molding. However, in general, when molding an EVOH resin, it is necessary to set the melting temperature to be 200° C. or higher. Therefore, EVOH containing no additives is liable to deteriorate when being melt molded and it accordingly may cause deterioration in product quality due to formation of fish eyes or hard spots in products. In addition, it is necessary to add some additives in order also to improve the interlayer adhesiveness when using it with other resins while laminating them.

In a pamphlet of WO 99/05213 (U.S. Pat. No. 6,174,949), disclosed is an EVOH resin composition containing a boron compound as an essential component, acetic acid as an optional component, and at least one compound as an essential component selected among acetic acid salts and phosphoric acid compounds, the content of each component based on 100 parts by weight of EVOH being 0.001 to 1 part by weight in terms of boron for the boron compound, 0 to 0.05 part by weight for acetic acid, 0.001 to 0.05 part by weight in terms of metal for the acetic acid salt, and 0.0005 to 0.05 part by weight in terms of phosphate group for the phosphoric acid compound. This resin composition is reported to be an EVOH resin composition having been improved in long-run workability, appearance and interlayer adhesiveness. The publication discloses that the purpose of the incorporation of the acetic acid salt is to improve the long-run workability or the interlayer adhesiveness.

JP-A-164059/2001 (EP-A-1090953) discloses an EVOH resin composition which is characterized in that, when it is heated to melt, its MFR shows specific behavior and that it contains from 50 to 500 ppm of carboxylic acid having a molecular weight of less than 75, from 50 to 500 ppm, in terms of metal element, of an alkali metal salt, from 10 to 120 ppm, in terms of metal element, of an alkaline earth metal salt, from 10 to 200 ppm, in terms of phosphate radical, of a phosphoric acid compound and from 50 to 2000 ppm, in terms of boron element, of a boron compound. This resin composition is reported to be an EVOH resin composition which is superior in appearance and in long-run workability at the time of its melt molding, less suffers yellowing when being recycled, and shows a superior interlayer adhesiveness when being fabricated into a laminate. In this invention, the alkali metal salt and the boron compound are added for improving the interlayer adhesiveness and for improving the long-run workability, respectively.

As a typical method for producing pellets of EVOH containing the additives, a method in which water-containing EVOH pellets are contacted with an aqueous solution containing the additives is disclosed. According to this method, it is easy to control the amounts of minor components contained in the EVOH pellets through an adjustment of the solution concentration and, therefore, it is possible to obtain pellets of stable quality by contacting them with the aqueous solution and then drying.

As mentioned above, the addition of an alkali metal salt to an EVOH resin in order to improve the interlayer adhesiveness has been done conventionally. The alkali metal salt is added typically in the form of an acetate. In many cases, acetic acid, which is not in the form of a salt, is also added simultaneously. Such an EVOH resin composition containing an acetate radical, however, may emit an acetic acid smell. One of the main applications of EVOH resin compositions is food packaging containers. In the market, EVOH resin compositions emitting smell as less as possible have been sought. In addition, EVOH resin compositions having a more improved melt stability and a superior long-run workability have been awaited.

On the other hand, in many cases where EVOH resin composition pellets are produced by contacting water-containing EVOH pellets with an aqueous solution containing acetic acid or its salt, acetic acid is released to the atmosphere when the water-containing pellets resulting from the contact are dried. Therefore, the surrounding environment and the working environment may be affected.

The present invention was created for the purpose of solving the above-mentioned problems. The purpose of the present invention is to provide a method for producing an EVOH resin composition and a method for producing EVOH resin composition pellets which are environmentally friendly and in which no carboxylic acid such as acetic acid is released to the ambient atmosphere.

Another object of the present invention is to provide an EVOH resin composition and EVOH resin composition pellets which emit little smell and suitable, for example, for food packaging applications, and more preferably to provide an EVOH resin composition and EVOH resin composition pellets which have an improved melt stability and also have a superior long-run workability.

BRIEF DESCRIPTION OF THE DRAWING

The FIGURE shows the relationship between ethylene content and alkali metal salt according to Examples 7 to 10 of the invention.

DETAILED DESCRIPTION OF THE PREFERRED EMBODIMENTS

The objects described above, especially to provide an environmentally friendly method for producing an EVOH resin composition, can be achieved by providing a method for producing an ethylene-vinyl alcohol copolymer resin composition, wherein an ethylene-vinyl alcohol copolymer resin is contacted with an aqueous solution containing both carbon dioxide gas and at least one additive selected from the group consisting of an alkali metal salt (A) and a boron compound (B).

A production method in which the aqueous solution is prepared in advance and then the ethylene-vinyl alcohol copolymer resin is contacted therewith is preferred. A production method in which the content of a saponification catalyst residue is reduced by washing the EVOH resin with water and then the resin is contacted with the aqueous solution is also preferable.

In such a case, it is preferable that the aqueous solution with which the EVOH resin is contacted contain an alkali metal salt (A) as an essential ingredient. It is also preferable that the aqueous solution contain a boron compound (B) as an essential ingredient. It is also preferable that the pH of the aqueous solution be 3.5 to 6.5. A dry EVOH resin composition can be provided when the EVOH resin is dried until the water content thereof becomes 1% by weight or less after being contacted with the aqueous solution.

The challenges described above can be achieved by providing a method for producing ethylene-vinyl alcohol copolymer resin composition pellets, wherein ethylene-vinyl alcohol copolymer resin pellets are contacted with an aqueous solution containing both carbon dioxide gas and at least one additive selected from the group consisting of an alkali metal salt (A) and a boron compound (B).

In this case, preferred is a method for producing EVOH resin composition pellets wherein EVOH resin pellets having an water content of 10 to 80% by weight are contacted with the aqueous solution. In addition, preferred is a method for producing EVOH resin composition pellets wherein after being contacted with the aqueous solution, the EVOH resin pellets are dried until the water content thereof becomes 1% by weight or less.

Especially, an object to provide an EVOH resin composition which emits less smell and is superior also in long-run workability is achieved by providing an ethylene-vinyl alcohol copolymer resin composition that contains 0.1 to 20 µmol/g, in terms of alkali metal, of an alkali metal salt (A), 0 to 2 µmol/g of a carboxylate radical (C1) which is extracted through an immersion treatment in water at 95° C. for 10 hours, and 0 to 40 µmol/g of a carboxylate radical (C2) which is extracted through an immersion treatment in a 0.05 N aqueous sodium hydroxide solution at 95° C. for 10 hours. In this case, it is preferable that the degree of saponification of the EVOH be 99.7 to 100 mol %.

The above objects can also be achieved by providing an ethylene-vinyl alcohol copolymer resin composition, wherein the composition contains 0.1 to 20 µmol/g, in terms of alkali metal, of an alkali metal salt (A) and 0 to 2 µmol/g of a carboxylate radical (C1) which is extracted through an immersion treatment in water at 95° C. for 10 hours, and wherein the degree of saponification is 99.7 to 100 mol %.

In each of the EVOH resin compositions mentioned above, it is preferable that the ethylene content of the EVOH be 5 to 60 mol %. It is also preferable that the alkali metal salt (A) be a potassium salt. It is also preferable that the composition satisfy the following formula (1):

$$0.95 \times \exp(0.039 \times ET) - 2 \leq a \leq 0.95 \times \exp(0.039 \times ET) + 2 \quad (1)$$

wherein a is the content (µmol/g) of the alkali metal salt (A) in terms of alkali metal and ET is the ethylene content (mol %) of the ethylene-vinyl alcohol copolymer.

In each of the EVOH resin compositions mentioned above, it is preferable that the composition contain 1 to 200 µmol/g, in terms of boron element, of a boron compound (B). It is also preferable that the composition contain 0.05 to 5 µmol/g, in terms of phosphate radical, of a phosphoric acid compound (D). In this case, it is preferable that the ratio (a/d) of the content (a: µmol/g) of the alkali metal salt (A) in terms of alkali metal to the content (d: µmol/g) of the phosphoric acid compound (D) in terms of phosphate radical be 2.4 to 50. In addition, one preferable embodiment is pellets comprising any of these EVOH resin compositions.

The objects of the present invention can also be achieved by providing a melt-molded article comprising an ethylene-vinyl alcohol copolymer resin composition having a ratio (d/t) of the content (d: µmol/g) of a phosphoric acid compound (D) in terms of phosphate radical to the content (t: µmol/g) of phosphorus element of 0.4 or less.

In this case, it is preferable that the article contain 0.1 to 20 µmol/g, in terms of alkali metal, of an alkali metal salt (A). It is also preferable that the alkali metal salt (A) be a potassium salt. In addition, preferred is a melt-molded article satisfying the following formula (1):

$$0.95 \times \exp(0.039 \times ET) - 2 \leq a \leq 0.95 \times \exp(0.039 \times ET) + 2 \quad (1)$$

wherein a is the content (µmol/g) of the alkali metal salt (A) in terms of alkali metal and ET is the ethylene content (mol %) of the ethylene-vinyl alcohol copolymer.

It is preferable that the melt-molded article contain 1 to 200 µmol/g, in terms of boron element, of a boron compound (B). In addition, it is also preferable that the ethylene content of the ethylene-vinyl alcohol copolymer to be used be 5 to 60 mol %.

The present invention will be described in detail below.

The first invention of this application is a method for producing an ethylene-vinyl alcohol copolymer resin composition, wherein an ethylene-vinyl alcohol copolymer resin is contacted with an aqueous solution containing both carbon dioxide gas and at least one additive selected from the group consisting of an alkali metal salt (A) and a boron compound (B).

To make EVOH resin contain at least one additive selected from the group consisting of an alkali metal salt (A) and a boron compound (B), conventionally employed is a method in which an EVOH is contacted with an aqueous solution containing these additives. The present invention is characterized in that an EVOH is contacted with an aqueous solution containing carbon dioxide gas as well as those additives.

In order to improve the interlayer adhesiveness in a multi-layer structure including an EVOH layer, it is desirable that the EVOH resin composition contain an alkali metal salt (A). Therefore, EVOH resin is, in many cases, immersed in an aqueous solution containing the alkali metal salt (A), especially an acetic acid salt of alkali metal. If, however, the solution used for the immersion is alkaline, the stability at the time of melt molding often deteriorates. For eliminating this problem, an acid, especially a carboxylic acid typified by acetic acid, is further added in many cases.

However, if the content of carboxylate radical derived from carboxylic acid or its salt is large, a resulting EVOH resin composition will often generate a carboxylic acid odor and may cause problems when being used for food packaging applications. In addition, there also is a problem in that a carboxylic acid is released to the ambient atmosphere during the drying conducted after the immersion in the aqueous solution containing the additives. A method therefore has been awaited in which the alkali metal salt (A) is contained and a carboxylate radical is contained in a minimized amount but an aqueous solution containing additives is not made alkaline. The present invention solves this problem by making the aqueous solution containing the alkali metal salt (A) contain carbon dioxide gas.

For improving the long-run workability when melt molding an EVOH resin composition, it is desirable to add a boron compound (B). Therefore, in many cases, EVOH resin is immersed in an aqueous solution containing a boron compound (B). However, even if a boron compound (B) is contained, the long-run workability may still be insufficient for some applications. Further improvements are therefore awaited.

The present invention has solved this problem by making the aqueous solution containing the boron compound (B) further contain carbon dioxide gas. In other words, the reduction in content of the carboxylate radical through use of an aqueous solution containing carbon dioxide gas and the addition of the boron compound (B) enable EVOH resin compositions superior in long-run workability to be obtained.

The EVOH for use in the invention is preferably one obtained by saponifying an ethylene-vinyl ester copolymer. Particularly preferred is one obtained by saponifying an ethylene-vinyl acetate copolymer. From the viewpoint of obtaining a molded article superior in both gas barrier properties and melt moldability, the ethylene content of the EVOH is preferably from 5 to 60 mol %. If the ethylene content is less than 5 mol %, the melt moldability may be worse. If it exceeds 60 mol %, the gas barrier properties may be insufficient. The lower limit of the ethylene content is preferably 15 mol % or more, and more preferably 20 mol % or more. On the other hand, the upper limit of the ethylene content is preferably 55 mol % or less, and more preferably 50 mol % or less.

The degree of saponification of vinyl acetate moieties is preferably 80 to 100 mol %. From the viewpoint of obtaining a molded article superior in gas barrier properties, the degree of saponification is more preferably 95 mol % or more, still more preferably 98 mol % or more, and particularly preferably 99 mol % or more. If the degree of saponification is less than 80 mol %, the barrier properties, the long-run workability and the moisture resistance may be worse. In the case of producing an EVOH composition superior particularly in melt stability and also superior in long-run workability, the degree of saponification of the EVOH is preferably 99.7 mol % or more, more preferably 99.8 mol % or more, still more preferably 99.9 mol %, and particularly preferably 99.95 mol %.

During the copolymerization of ethylene and vinyl acetate, other vinyl esters of fatty acids (e.g., vinyl propionate, vinyl pivalate, etc.) may be used together. The EVOH may contain from 0.0002 to 0.2 mol % of a vinylsilane compound as a comonomer. The vinylsilane compounds includes, for example, vinyltrimethoxysilane, vinyltriethoxysilane, vinyltri(β-methoxyethoxy)silane and γ-methacryloxypropylmethoxysilane. Of these, vinyltrimethoxysilane and vinyltriethoxysilane are suitably employed.

The method of producing the EVOH for use in the invention is described concretely. The polymerization of ethylene and vinyl acetate is not restricted to solution polymerization and may be any of solution polymerization, suspension polymerization, emulsion polymerization and bulk polymerization. These may be conducted either in continuous mode or in batch mode. The polymerization conditions used in solution polymerization are as follows.

Solvent: Alcohols are preferred, but any other organic solvents (e.g., dimethylsulfoxide) capable of dissolving ethylene, vinyl acetate and ethylene-vinyl acetate copolymer may also be used. Alcohols usable herein include methyl alcohol, ethyl alcohol, propyl alcohol, n-butyl alcohol, t-butyl alcohol and the like. Especially preferred is methyl alcohol.

Catalyst: Usable are azonitrile-type initiators such as 2,2-azobisisobutyronitrile, 2,2-azobis-(2,4-dimethylvaleronitrile), 2,2-azobis-(4-methyl-2,4-dimethylvaleronitrile), 2,2-azobis-(4-methoxy-2,4-dimethylvaleronitrile), and 2,2-azobis-(2-cyclopropylpropionitrile); organic peroxide-type initiators such as isobutyryl peroxide, cumyl peroxyneodecanoate, diisopropyl peroxycarbonate, di-n-propyl peroxydicarbonate, t-butyl peroxyneodecanoate, lauroyl peroxide, benzoyl peroxide and t-butyl hydroperoxide.

Temperature: 20 to 90° C., preferably 40° C. to 70° C.

Time (average residence time in the case of continuous mode): 2 to 15 hours, preferably 3 to 11 hours.

Degree of polymerization: 10 to 90%, preferably 30 to 80% based on the vinyl ester fed into the reactor.

Resin content of the solution after polymerization: 5 to 85%, preferably 20 to 70%.

Ethylene content in copolymers: Preferably 5 to 60 mol %, more preferably 15 to 55 mol %, even most preferably 20 to 50 mol %.

Except for ethylene and vinyl acetate, any other minor comonomers capable of copolymerizing with them may be present in the polymerization system. The comonomers include, for example, α-olefins such as propylene, isobutylene, α-octene and α-dodecene; unsaturated acids such as acrylic acid, methacrylic acid, crotonic acid, maleic acid and itaconic acid and their anhydrides, salts, or mono- or di-alkyl esters; nitriles such as acrylonitrile and methacrylonitrile; amides such as acrylamide and methacrylamide; olefinsulfonic acids such as ethylenesulfonic acid, allylsulfonic acid and methallylsulfonic acid and their salts; alkyl vinyl ethers, vinyl ketones, N-vinylpyrrolidone, vinyl chloride and vinylidene chloride.

After the monomers have been polymerized for a predetermined period of time to give the intended copolymer having a predetermined degree of polymerization, a polymerization inhibitor may be added thereto, if desired. Then, the unreacted ethylene gas is evaporated away, and the unreacted vinyl acetate is purged away. To purge the non-reacted vinyl acetate from the ethylene-vinyl acetate copolymer solution after the removal of ethylene by evaporation, for example, the copolymer solution is continuously fed, downward at a constant flow rate, into a column filled with raschig rings at its top while a vapor of an organic solvent such as methanol or the like is jetted into the column from its bottom, whereby a mixed vapor of the organic solvent such as methanol or the like and the unreacted vinyl acetate is run off from the column through its top, and the copolymer solution from which the unreacted vinyl acetate has been removed is taken out of the column through its bottom. The above-mentioned method or the like is employed.

An alkali catalyst is added to the copolymer solution from which the unreacted vinyl acetate has been removed, whereby the vinyl acetate moiety of the copolymer is saponified. For this, employable is any of continuous or batchwise saponification. The alkali catalyst includes, for example, sodium hydroxide, potassium hydroxide, alkali metal alcoholates and the like. The solvent for use in the saponification is preferably methanol. For example, the conditions for saponification are as follow:

Concentration of copolymer solution: 10 to 50%.

Reaction temperature: 30 to 150° C.

Amount of catalyst to be used: 0.005 to 0.6 equivalent (based on the vinyl acetate moiety).

Time (average residence time in the case of continuous mode): 10 minutes to 6 hours.

Generally, in continuous saponification, a resin with a higher degree of saponification can be obtained by use of a catalyst in an amount less than that used in batchwise saponification because as in continuous saponification the methyl acetate resulting from the saponification can be removed more efficiently. Continuous saponification must be carried out at higher temperatures for the purpose of preventing EVOH formed in the saponification from forming crystals. In continuous saponification, therefore, it is preferable to use a reaction temperature and an amount of catalyst falling within the ranges shown below.

Reaction temperature: 70 to 150° C.

Amount of catalyst to be used: 0.005 to 0.1 equivalent (based on the vinyl acetate moiety).

The degree of saponification achieved by the saponification varies depending on the purpose of saponification, but is preferably at least 80 mol % of the vinyl acetate moieties, more preferably at least 95 mol % thereof, even more preferably at least 98 mol % thereof, still more preferably at least 99 mol % thereof. The degree of saponification can be varied in any desired manner by controlling the conditions for saponification.

In the case of producing an EVOH composition superior particularly in melt stability and also superior in long-run workability, the degree of saponification of the EVOH is preferably 99.7 mol % or more, more preferably 99.8 mol % or more, still more preferably 99.9 mol % or more, and particularly preferably 99.95 mol % or more. For the purpose of obtaining such EVOH, it is preferable to further control saponification conditions as follows.

To obtain an EVOH with a degree of saponification of 99.9 mol % or higher, continuous saponification is preferable. Examples of the method for obtaining a high degree of saponification by use of continuous saponification include a method in which a catalyst is added at two or more sites in the saponification reaction column, a method in which an increased amount of catalyst is employed, and a method in which an increased amount of methanol is jetted into the saponification reaction column from its bottom. Examples of the method for obtaining an EVOH with a degree of saponification of 99.9 mol % or higher include a method in which a catalyst is added separately in two or more portions, a method in which an increased amount of catalyst is employed, and a method in which an increased amount of methanol vapor or nitrogen gas is jetted into the saponification reactor.

The method for producing EVOH pellets from an alcohol solution of the resulting EVOH after the saponification is not particularly limited. Preferably, water-containing pellets are obtained by forming a strand-like solid from an alcoholic solution of EVOH in a coagulation bath and then cutting the strand. Before the forming of the strand, the EVOH concentration may be made higher than that at the time of the saponification by concentrating the alcoholic solution or, alternatively, a solution of EVOH in a water/alcohol mixed solvent or a water-containing composition of EVOH may be prepared through a replacement of part or the whole of methanol by water. Water-containing pellets are obtained by extruding the resulting solution or composition into water or into an aqueous alcohol solution containing a small amount of alcohol to form a strand-like solid and then cutting it. Alternatively, pellets can be produced by cutting the extrudate still in a flowing state without making it form a strand-like solid, and then solidifying it.

The water-containing pellets obtained in the manner described above is porous. Therefore, it is easy to remove the saponification catalyst residue by washing with water. It is also easy to add additives to the pellets or to dry the pellets after the removal. Such water-containing pellets preferably have a water content of 10 to 80% by weight because it will result in a great operational advantage. The water content is more preferably 20% by weight or more, and still more preferably 30% by weight or more. In addition, the water content is more preferably 70% by weight or less, and still more preferably 60% by weight or less.

The thus-obtained water-containing pellets usually contain a saponification catalyst residue, namely an alkali metal salt, e.g. sodium acetate, which will cause a yellowing problem or the like. Therefore, it is desirable to remove the alkali metal salt by washing. The content of an alkali metal salt in water-containing before washing is in general approximately from 100 to 10000 μmol/g (EVOH weight), in terms of alkali metal. The washing method is not particularly restricted, but washing with water is preferred. The water used as a washing liquid herein may be an aqueous solution of acid such as acetic acid in order to remove alkali metal ions efficiently. It is also desirable to reduce the content of the saponification catalyst residue efficiently by combining the washing with water and the washing with acid.

It is desirable to reduce the alkali metal content in water-containing pellets after the washing to 0 to 50 μmol/g (EVOH weight), in terms of alkali metal. The upper limit of the alkali metal content is more preferably 40 μmol/g, more preferably 30 μmol/g, and particularly preferably 20 μmol/g. The saponification catalyst residue is generally contained in the form of an alkali metal salt of acetic acid. Therefore, making water-containing pellets after washing have a sufficiently reduced alkali metal content in advance makes it easy to obtain an EVOH composition having a reduced carboxylate content.

The method for washing the water-containing pellets is not particularly restricted. Any of a batch treatment vessel and a continuous treatment vessel may be employed. In particular, a method in which pellets are treated while being fed continuously in a column vessel is preferable from the viewpoint of productivity.

The present invention provides a method for producing an EVOH resin composition, wherein an EVOH resin is contacted with an aqueous solution containing both carbon dioxide gas and at least one additive selected from the group consisting of an alkali metal salt (A) and a boron compound (B). The aqueous solution with which the EVOH resin is contacted is an aqueous solution containing at least one additive selected from the group consisting of an alkali metal salt (A) and a boron compound (B) and also containing carbon dioxide gas.

The amount of the carbon dioxide gas contained in the aqueous solution is not particularly limited and may be adjusted appropriately. However, it is necessary to dissolve carbon dioxide gas in an amount more than the amount in which carbon dioxide gas contained in the air dissolves spontaneously. The concentration of carbon dioxide gas (the sum of free carbon dioxide and carbonic acid) in the aqueous solution is preferably 0.5 mmol/L or more, more preferably 2 mmol/L or more, and still more preferably 10 mmol/L or more. In order to increase the solubility of carbon dioxide gas, the treatment may be conducted under elevated pressure approximately from 1.5 to 10 atm.

When adopting a method of treating pellets by feeding them continuously by use of a continuous treatment vessel, especially, a column vessel, a too high carbon dioxide gas concentration in the aqueous solution may result in formation of bubbles around EVOH pellets to have some adverse effect on the sedimentation property of resin. Therefore, when such a continuous treatment process is applied, it is preferable in some cases that the carbon dioxide gas concentration in an aqueous solution be lower than the saturated carbon dioxide gas concentration. In such cases, the carbon dioxide gas concentration is set at a value lower than the saturated carbon dioxide gas concentration. It preferably is set to be not higher than 0.95 time the saturated carbon dioxide gas concentration, and more preferably is set to be not higher than 0.9 time the saturated carbon dioxide gas concentration. The concentration is determined depending also on the temperature of a treatment solution and the pressure. On the other hand, when a batch treatment vessel is used, no sedimentation property problem described above usually arises. However, the upper limit of the carbon dioxide gas concentration may be set in the same manner as continuous treatment vessels.

In the interest of securing interlayer adhesiveness and long-run workability, it is preferable that the aqueous solution contain an alkali metal salt (A). A preferred range of the content of the alkali metal salt (A) is influenced by the water content of water-containing pellets. In general, however, it is preferably 0.05 to 40 mmol/L. A more preferable lower limit of the content of the alkali metal salt (A) in the aqueous solution is 0.1 mmol/L. A more preferable upper limit is 20 mmol/L. As described later, a desirable content of the alkali metal salt (A) in the resin composition varies depending on the ethylene content of EVOH. It therefore is preferable to adjust the content of the alkali metal salt (A) in the aqueous solution in correspondence therewith.

The type of cations of the alkali metal salt (A) is not specifically restricted. Although the salt is selected from lithium salts, sodium salts, potassium salts, rubidium salts and cesium salts, sodium salts and potassium salts are preferable. Potassium salts are particularly preferable. The use of a potassium salt can yield an EVOH resin composition superior in both interlayer adhesiveness and long-run workability.

The type of anions of the alkali metal salt (A) is not also specifically restricted. The alkali metal salt can be added in the form of carbonate, hydrogencarbonate, phosphate, hydrogenphosphate, hydroxide, carboxylate or the like. Especially, it is preferable to add the salt in the form of carbonate, hydrogencarbonate, hydrogenphosphate or hydroxide. Moreover, it is also preferable to add the alkali metal salt in the form of borate as described below. However, in light of the purpose of the present invention to reduce the content of carboxylate radicals, it is not preferable that the alkali metal salt be a carboxylate.

It is preferable that the aqueous solution contain a boron compound (B) because the long-run workability at the time of melt-molding can be improved. The concentration of the boron compound (B) in the aqueous solution is preferably 0.1 to 50 mmol/L in terms of boron element because this makes a dry resin composition pellets possible to contain an appropriate amount of boron compound (B). The lower limit of the concentration of the boron compound (B) is more preferably 0.5 mmol/L or more, and still more preferably 1 mmol/L or more. The upper limit thereof is more preferably 40 mmol/L or less, and still more preferably 30 mmol/L or less. If the concentration exceeds 50 mmol/L, the EVOH resin composition is liable to gelate and the appearance of molded articles may deteriorate.

Examples of the boron compound (B) for use in the preparation of the aqueous solution include, but are not limited to, boric acids, boric acid esters, boric acid salts and borohydrides. Specifically, the boric acids include orthoboric acid, metaboric acid and tetraboric acid; the boric acid esters include triethyl borate and trimethyl borate; and the boric acid salts include alkali metal salts and alkaline earth salts of boric acids such as those mentioned above and borax. Among these compounds, preferred is orthoboric acid, which henceforth is sometimes referred simply as boric acid.

In view of the object of the present invention, it is desirable that the aqueous solution contain no carboxylic acid or its salt (C). It, however, should be noted that this does not exclude a case where a carboxylic acid or its salt (C) remaining in the EVOH resin is eluted into the aqueous solution to be contained therein. Moreover, a case where the aqueous solution contains a carboxylic acid or its salt (C) unless the effect of the present invention is affected is not excluded as well.

In order to balance the long-run workability and the yellowing resistance at the time of melt molding, especially the yellowing resistance and interlayer adhesiveness in high-temperature molding, it is desirable for the aqueous solution to contain a phosphoric acid compound (D). Containing the phosphoric acid compound (D) in an appropriate amount makes it possible to inhibit yellowing of molded articles and generation of gels and hard spots when melt-molding the resulting EVOH resin composition. When adding a phosphoric acid compound (D), the upper limit of the concentration of the phosphoric acid compound (D) in the aqueous solution, in terms of phosphate radical, is preferably 10 mmol/L, more preferably 5 mmol/L, still more preferably 3.5 mmol/L, and most preferably 2.5 mmol/L. On the other hand, when adding a phosphoric acid (D), the lower limit of the concentration of the phosphoric acid compound (D) in the aqueous solution, in terms of phosphate radical, is preferably 0.01 mmol/L, more preferably 0.03 mmol/L, still more preferably 0.05 mmol/L, and most preferably 0.1 mmol/L.

Examples of the phosphoric acid compound (D) for use in the preparation of the aqueous solution include various acids, such as phosphoric acid and phosphorous acid, and their salts. Phosphoric acid salts may be contained in any form of primary phosphate, secondary phosphate and tertiary phosphate. The type of their cations is not also particularly restricted, but alkali metal salts are preferred. In particular, addition of a phosphoric acid compound (D) in the form of sodium dihydrogenphosphate, potassium dihydrogenphosphate, disodium hydrogenphosphate or dipotassium hydrogenphosphate is preferred.

The aqueous solution may contain an alkaline earth metal salt (E). However, it is inappropriate to add it in a large amount because alkali earth metal salts easily form slightly soluble. In some applications, addition of the alkaline earth metal salt (E) in an appropriate amount makes it is possible to improve the long-run workability when melt-molding the resulting EVOH resin composition. Addition of the alkaline earth metal salt (E) may be optionally conducted. When adding, the concentration of the alkaline earth metal salt (E) in the aqueous solution ranges 0 to 10 mmol/L in terms of alkaline earth metal. Addition of the alkaline earth metal salt (E) is preferable because it is possible to make dry resin composition pellets contain the salt. The upper limit thereof is more preferably 5 mmol/L or less, and still more preferably 3 mmol/L or less.

The type of the cation of the alkaline earth metal salt (E) is not particularly restricted. Examples of the salt include magnesium salts, calcium salts, barium salts and strontium salts. Magnesium salts and calcium salts are preferred. The type of the anion of the alkaline earth metal salt (E) is not also restricted particularly. The salt may be added in the form of a carbonate, a hydrogencarbonate, a phosphate, a hydrogenphosphate, a hydroxide and a carboxylate. In particular, it is preferable to add the salt in the form of a carbonate, a hydrogencarbonate, a hydrogenphosphate or a hydroxide. In general, many of the alkaline earth metal salts are slightly soluble in water, but their solubilities are increased by the presence of carbonate. However, in view of the object of the present invention to lessen the content of carboxylate radicals, it is preferable for the alkaline earth metal salt (E) not to be a carboxylate.

The pH of the aqueous solution containing the additives and carbon dioxide gas is preferably 3.5 to 6.5. Making an aqueous solution contain at least a certain amount of carbon dioxide gas permits the aqueous solution to be as acidic as described above. The pH value is more preferably 3.8 or more and still more preferably 4 or more. The pH value is more preferably 6.3 or less, still more preferably 6.0 or less, and most preferably 5.8 or less.

The method for preparing the aqueous solution containing the additives and carbon dioxide gas is not particularly restricted. At least one additive selected from the group consisting of an alkali metal salt (A) and a boron compound (B) may be added to an aqueous solution in which carbon dioxide gas was dissolved in advance. Conversely, carbon dioxide gas may be dissolved in an aqueous solution in which at least one additive selected from the group consisting of an alkali metal salt (A) and a boron compound (B) was dissolved in advance. Alternatively, the foregoing two types of aqueous solutions prepared in advance may be mixed.

The method for contacting EVOH resin with the aqueous solution is not particularly restricted, but a method in which the EVOH resin is immersed in the aqueous solution is desirable. The EVOH resin may have any shape during its immersion in the aqueous solution, such as powder, granules, sphere and circular cylinder pellet. For example, it is preferable to contact water-containing EVOH pellets prepared in the matter described previously with the aforementioned aqueous solution. To immerse the water-containing pellets in the aqueous solution permits the EVOH resin pellets to contain the alkali metal salt (A) or the boron compound (B) efficiently and homogeneously. The water content of the water-containing pellets before the immersion in the aqueous solution is preferably 10 to 80% by weight. The water content is more preferably not less than 20% by weight, and still more preferably not less than 30% by weight. In addition, it is more preferably 75% by weight or less, and still more preferably 70% by weight or less.

The temperature of the aqueous solution when it is contacted with EVOH resin is not particularly limited, but it is preferably 10 to 90° C. If the temperature is less than 10° C., it may take too much time to make the EVOH pellets to contain the alkali metal salt (A) or the boron compound (B) homogeneously. If it exceeds 90° C., the saturation solubility of carbon dioxide gas will decrease and it will be difficult to make the solution contain a sufficient amount of carbon dioxide gas in the above-mentioned solution in some cases. In addition, pellets may attach to each other. The temperature of the aqueous solution is more preferably 20° C. or higher, and still more preferably 30° C. or higher. In addition, it is more preferably 85° C. or lower, and still more preferably 80° C. or lower. When the contact is conducted at a temperature of 70° C. or higher, the solubility of carbonic acid becomes small and, therefore, it is preferable to conduct the contact under pressure almost at 1.5 to 10 atm.

The desirable range of the time for which EVOH resin is contacted with the aqueous solution varies depending on the form of the EVOH resin. For pellets having a size approximately ranging from 1 to 10 mm, the time is preferably 1 hour or longer, and still more preferably 2 hours or longer.

The method for contacting EVOH resin with the aqueous solution is not particularly restricted. It is permitted to contact the EVOH resin with water in advance and thereafter dissolve carbon dioxide gas or additives in water. However, preferred is a method in which an aqueous solution prepared in advance by dissolving those ingredients is contacted with the EVOH resin because an EVOH resin composition with a stable quality which contains additives uniformly can be obtained.

Regarding the mode for contacting the EVOH resin with the aqueous solution, any of a batch mode and a continuous mode maybe adopted. In the continuous mode, a preferable example is a method in which an EVOH resin is moved downward slowly in a column-type vessel and the resin is simultaneously contacted with an aqueous solution which is fed continuously.

It is also permitted to prepare two or more aqueous solutions and then carry out the contact in two or more times. For example, a method which comprises contacting first with an aqueous solution containing an alkali metal salt (A) or a boron compound (B) only and then contacting with an aqueous solution containing carbon dioxide gas in addition to the alkali metal salt (A) or the boron compound (B) may also be adopted.

EVOH resin, preferably EVOH resin pellets, is immersed in the aqueous solution first, then dewatered, and thereafter is subjected to a drying step. The drying method is not particularly restricted. A hot air dryer or the like may be employed. As a dryer, either a fluidized dryer or a static dryer is available. Alternatively, these dryers may be used in combination. Preferred is a method comprising drying by the fluidized drying method first and subsequently drying by the static drying method. The drying temperature is not particularly limited, but a temperature from about 70 to 120° C. is generally employed. The temperature may be increased with the progress of the drying. The water content after the drying is generally 1% by weight or less, and preferably 0.5% by weight of less. The thus obtained dry pellets are subjected to the following molding step.

In the production method of the present invention, a resin composition containing almost no carboxylate radical can be obtained. Therefore, it is also possible to provide an environmentally friendly production method in which no carboxylic acid volatilizes in this drying step and no carboxylic acid is released to the surrounding.

A second invention of this application is an ethylene-vinyl alcohol copolymer resin composition that contains 0.1 to 20 µmol/g, in terms of alkali metal, of an alkali metal salt (A), 0 to 2 µmol/g of a carboxylate radical (C1) which is extracted through an immersion treatment in water at 95° C. for 10 hours, and 0 to 40 µmol/g of a carboxylate radical (C2) which is extracted through an immersion treatment in a 0.05 N aqueous sodium hydroxide solution at 95° C. for 10 hours.

This EVOH resin composition is a novel resin composition which releases less odor and which is superior in long-run workability at the time of melt molding. The EVOH resin composition is preferably a composition produced by the production method described in the first invention, but it is not restricted to one produced by that method.

This resin composition contains an alkali metal salt (A) in an amount of 0.1 to 20 µmol/g in terms of alkali metal. Containing the alkali metal salt (A) improves the resin composition itself in interlayer adhesiveness, yellowing resistance and long-run workability at the time of melting. When the content is less than 0.1 µmol/g, both the yellowing resistance and the long-run workability at the time of melting as well as the interlayer adhesiveness are insufficient. If the content exceeds 20 µmol/g, the yellowing resistance at the time of melting will be poor. When the content is within the range of 0.1 to 0.3 µmol/L, the yellowing resistance and the long-run workability at the time of melting are relatively good. However, when using with other resins in a multilayer structure, use of a normal acid anhydride-modified adhesive resin will achieve an insufficient adhesive strength. The lower limit of the content of the alkali metal salt (A) is more preferably 0.3 µmol/g or more, and still more preferably 0.5 µmol/g or more. The upper limit of the content of the alkali metal salt (A) is preferably 15 µmol/g or less, more preferably 10 µmol/g or less, and particularly preferably 8 µmol/g or less.

It is preferable that the content of the alkali metal salt (A) and the ethylene content of the EVOH satisfy the following formula (1):

$$0.95 \times \exp(0.039 \times ET) - 2 \leq a \leq 0.95 \times \exp(0.039 \times ET) + 2 \quad (1)$$

wherein a is the content (µmol/g) of the alkali metal salt (A) in terms of alkali metal and ET is the ethylene content (mol %) of the ethylene-vinyl alcohol copolymer.

When the content of the alkali metal salt (A) is larger beyond the range provided by formula (1) above, the hue of the resin composition may get worse. On the other hand, when the content is less beyond the range provided by formula (1) above, the long-run workability and the adhesiveness may be reduced. The two contents more preferably satisfy the following formula (1') and still more preferably satisfy the following formula (1").

$$0.95 \times \exp(0.039 \times ET) - 1.5 \leq a \leq 0.95 \times \exp(0.039 \times ET) + 1.5 \quad (1')$$

$$0.95 \times \exp(0.039 \times ET) - 1 \leq a \leq 0.95 \times \exp(0.039 \times ET) + 1 \quad (1'')$$

The invented resin composition contains 0 to 2 µmol/g of a carboxylate radical (C1) which is extracted through an immersion treatment in water at 95° C. for 10 hours. Because most of the carboxylic acid and the salt thereof contained in an EVOH resin composition are extracted through the immersion treatment in water at 95° C. for 10 hours, a value almost corresponding to the total content of the acid and salt is indicated for the carboxylate radical (C1). In other words, the invented resin composition is a resin composition having an extremely small content of a carboxylic acid and a salt thereof. The content of the carboxylate radical (C1) is preferably 1.5 µmol/g or less, more preferably 1 µmol/g or less, and still more preferably 0.5 µmol/g or less.

The invented resin composition contains 0 to 40 µmol/g of a carboxylate radical (C2) which is extracted through an immersion treatment in a 0.05 N aqueous sodium hydroxide solution at 95° C. for 10 hours. Through the immersion treatment in a 0.05 N aqueous sodium hydroxide solution at 95° C. for 10 hours, most of the carboxylic acid and the salt thereof contained in an EVOH resin composition are extracted. In addition, saponification reaction proceeds at most of the unsaponified carboxylic acid ester groups remaining in an EVOH resin and a carboxylate radical, which is a hydrolysis product, is liberated to be extracted. In other words, the invented resin composition is a resin composition having a small total content of a carboxylic acid, a salt thereof and a carboxylic acid ester group. The content of the carboxylate radical (C2) is preferably 20 µmol/g or less, more preferably 10 µmol/g or less, still more preferably 5 µmol/g or less, and most preferably 2 µmol/g or less.

During the melt molding of an EVOH resin composition, the temperature usually reaches 200° C. or higher. At such temperatures, many types of reactions can proceed. Carboxylic acid ester groups contained in an EVOH resin are expected to be hydrolyzed through a reaction with water to liberate carboxylic acids or are expected to undergo transesterification with carboxylic acids or carboxylic acid salts. Moreover, carboxylic acids or their salts are expected to react with hydroxyl groups in EVOH to form carboxylic acid ester groups or are expected to undergo transesterification with carboxylic acid ester groups. In other words, in melt-molding, especially, long melt-molding, chemical reactions which occur within molten resin during the melting by heating cannot be disregarded.

The resin composition of the present invention, which resulted from focusing attention in this respect, intends to achieve both improvement in melt stability of resin and prevention of odor generation by controlling the sum of the contents of carboxylic acids, salts thereof and carboxylic acid esters, which can be converted reciprocally. It is possible to provide a resin composition extremely superior in long-run workability by reducing, to an extremely small amount, a carboxylate radical (C1) which was originally and still is liberated and which is extracted through an immersion treatment in water at 95° C. for 10 hours and by controlling the amount of a carboxylate radical (C2) which is extracted through an immersion treatment in a 0.05 N aqueous sodium hydroxide solution at 95° C. for 10 hours, the amount being that of substances including what can be liberated under heating and melting conditions to a certain value or smaller.

As the EVOH resin to be used as a raw material for this composition, those described in the explanation of the foregoing first invention are available.

A third invention of this application is an ethylene-vinyl alcohol copolymer resin composition, wherein the composition contains 0.1 to 20 µmol/g, in terms of alkali metal, of an alkali metal salt (A) and 0 to 2 µmol/g of a carboxylate radical (C1) which is extracted through an immersion treatment in water at 95° C. for 10 hours, and wherein the degree of saponification is 99.7 to 100 mol %.

This, which is a resin composition similar to the resin composition of the aforementioned second invention, is expressed, in degree of saponification, the amount of unsaponified carboxylic acid ester groups instead of carboxylate radical (C2) which is extracted through an immersion treatment in a 0.05 N aqueous sodium hydroxide solution at 95° C. for 10 hours. When the degree of saponification of EVOH is 99.7 mol % or more, a good long-run workability at the time of melt molding is achieved. The degree of saponification is more preferably 99.8 mol % or more, still more preferably 99.9 mol % or more, and especially preferably 99.95 mol % or more.

It is preferable that the resin composition of the second or third invention further contain a boron compound (B) because the long-run workability at the time of melt molding is more improved. The effect of the incorporation of the boron compound (B) and the kind thereof are the same as those described in the description of the production method of the first invention. The content of the boron compound (B) is preferably 1 to 200 µmol/g in terms of boron element. It is more preferably not less than 2 µmol/g, and still more preferably not less than 3 µmol/g. On the other hand, it is more preferably 150 µmol/g or less, and still more preferably 100 µmol/g or less.

Moreover, it is preferably that the resin composition contain a phosphoric acid compound (D) for balancing the long-run workability and yellowing resistance at the time of melt molding, especially the yellowing resistance in high-temperature molding, and the interlayer adhesiveness. The effect of the incorporation of the phosphoric acid compound (D) and the kind thereof are the same as those described in the description of the production method of the first invention. The upper limit of the content of the phosphoric acid compound (D) is preferably 5 µmol/g, more preferably 4 µmol/g, still more preferably 3 µmol/g, and most preferably 1.5 µmol/g. Too much phosphate radical may cause a reduction in long-run workability. On the other hand, the lower limit of the content of the phosphoric acid compound (D), in terms of phosphate radical, is preferably 0.05 µmol/g, more preferably 0.1 µmol/g, still more preferably 0.15 µmol/g, and most preferably 0.2 µmol/g.

In this situation, it is preferable that in the resin composition the ratio (a/d) of the content (a: µmol/g) of the alkali metal salt (A) in terms of alkali metal to the content (d: µmol/g) of the phosphoric acid compound (D) in terms of phosphate radical be 2.4 to 50. This can result in a resin composition superior in hue and long-run workability. When the ratio (a/d) is less than 2.4, the long-run workability may be reduced. On the other hand, when the ratio (a/d) exceeds 50, the hue may get worse and, in some cases, the long-run workability will be affected. The ratio (a/d) is more preferably not more than 40, and still more preferably not more than 30.

The resin composition may also contain an alkaline earth metal salt (E). The effect of the incorporation of the alkaline earth metal salt (E) and the kind thereof are the same as those described in the description of the production method of the first invention. The content of the alkaline earth metal salt (E) is preferably 0 to 10 µmol/g in terms of alkaline earth metal. It is more preferably 5 µmol/g or less, and still more preferably 3 µmol/g or less. Especially, when importance is placed on inhibition of yellowing at the time of melt molding, the content of the alkaline earth metal salt (E) is more preferably not more than 2 µmol/g, and still more preferably not more than 1 µmol/g. It is preferable that substantially no alkaline earth metal salt (E) be contained.

A desirable melt flow rate (MFR) (measured at 190° C. under a load of 2160 g; the measurements are carried out under 2160 g load at two or more temperatures not lower than the melting point of about 190° C. or more than 190° C. The results are plotted, in a semilog graph, with reciprocals of absolute temperatures as abscissa against logarithms of MFRs as ordinate and the MFR is represented by an extrapolation to 190° C.) of the resin composition comprising EVOH obtained in the present invention is preferably 0.1 to 200 g/0 min. The lower limit of MFR is more preferably not lower than 0.2 g/10 min, still more preferably not lower than 0.5 g/10 min, and most preferably not lower than 1 g/10 min. The upper limit of MFR is more preferably 50 g/10 min or lower, still more preferably 30 g/10 min or lower, and most preferably 15 g/10 min or lower. The cases where the melt flow rate is lower than these ranges are not preferred because the inside of an extruder during molding will be in a high torque condition and it will become difficult to execute extrusion processing. The cases where the melt flow rate is higher than those ranges are not preferred because the mechanical strength of molded articles will be insufficient.

It is also permitted to blend an EVOH differing in degree of polymerization, ethylene content and degree of saponification to the resin composition obtained in the present invention and then perform melt molding. Moreover, it is also permitted to add appropriate amounts of various plasticizers, lubricants, stabilizers, surfactants, colorants, UV absorbers, antistatic agents, driers, crosslinking agents, metal salts, fillers and reinforcements such as various types of fiber. A resulting resin composition is subjected to a melt molding step preferably in the form of pellets.

A fourth invention of this application is a melt-molded article comprising an ethylene-vinyl alcohol copolymer resin composition having a ratio (d/t) of the content (d: µmol/g) of a phosphoric acid compound (D) in terms of phosphate radical to the content (t: µmol/g) of phosphorus element of 0.4 or less. The article is preferably, but not limited to, one which is obtained by melt-molding the resin composition of the aforementioned second or third invention.

The content (d) of a phosphoric acid compound (D) used herein is, for example, a value calculated from the amount of the phosphate radical extracted from a melt-molded article when the article is immersed in an aqueous solution. In other words, the content (d) indicates the amount of the phosphoric acid compound (D) which is contained in the form of phosphoric acid or its salt in a resin composition and which can be extracted with an aqueous solution. On the other hand, the content (t) of phosphorus element is, for example, a value determined through measurement by emission analysis for the amount of phosphorus element contained in an aqueous solution obtained by dissolving ash resulting from complete combustion of a melt-molded article. In other words, determined is not only the phosphorus element to be extracted through an extraction operation in an aqueous solution but the whole phosphorus element contained in a melt-molded article. Accordingly, the fact that the ratio (d/t) is 0.4 or less means that not less than half of the whole phosphorus element contained in the melt-molded article is contained in the form which can not be extracted.

Up to date, it has been reported that in the case of making a phosphoric acid compound (D) be contained in EVOH, approximately all the phosphoric acid compound (D) contained in a resin composition can be extracted. Moreover, also after melt-molding the resin composition, approximately all phosphoric acid compound (D) can be extracted. Therefore, the ratio (d/t) is a value close to 1 after melt-molding as well. As opposed to this, the resin composition obtained in the present invention is characterized in that when the composition is made contain a phosphoric acid compound (D) through its immersion in an aqueous solution and then only dried, it is possible to extract approximately all the compound, whereas when further heated in a molten state, it will become impossible to extract that compound.

It is not necessarily clear in what chemical structure the phosphorus element contained in the melt-molded article of the present invention exists. However, it is assumed that the phosphoric acid compound (D) is in the form of a phosphoric acid ester resulting from its reaction with a hydroxyl group of EVOH. It is assumed that fixing the phosphoric acid compound (D) to the molecular chain of EVOH is preventing the compound from being extracted. It is conceivable that the adoption of a method never known before, such as immersion in an aqueous solution containing carbon dioxide gas, has made it possible to obtain a novel resin composition never known before. The method for producing a melt-molded article having a ratio (d/t) of 0.4 or less is not particularly restricted.

A resulting melt-molded articles having a ratio (d/t) of 0.4 or less is superior in long-run workability. It is also conceivable that the phosphorus element assumed to be fixed to the molecular chain of EVOH contributes to the heat stability. The ratio (d/t) is preferably 0.35 or less, more preferably 0.3 or less, still more preferably 0.25 or less, and most preferably 0.2 or less.

A preferable range of the phosphorus element content (t) is the same as the content of phosphoric acid compound (D) in the resin compositions of the second and third inventions described previously. This is because the phosphorus element content (t) does not differ substantially before and after the melt heating. The content is preferably 5 µmol/g, more preferably 4 µmol/g, still more preferably 3 µmol/g, and most preferably 1.5 µmol/g. On the other hand, the lower limit of the phosphorus element content (t), in terms of phosphoric acid radical, is preferably 0.05 µmol/g, more preferably 0.1 µmol/g, still more preferably 0.15 µmol/g, and most preferably 0.2 µmol/g.

The types and contents of the alkali metal salt (A), boron compound (B), carboxylate radicals (C1, C2) and alkaline earth metal salt (E) are the same as those in the cases of the resin compositions of the second and third inventions. In addition, the same statements are true for the type of the EVOH to be used and the relation between the content of the alkali metal salt (A) and the ethylene content of the EVOH. These values substantially do not change before and after the melt molding.

The melt molded article of the present invention may be any one which is molded after the EVOH resin composition is once molten. Not only molded articles in various forms each suitable for some applications but also pellets obtained by melt kneading, extruding and then cutting are included in the melt molded article of the present invention. The melt molded article of the present invention may contain EVOHs differing in degree of polymerization, ethylene content and degree of saponification. Moreover, it may contain various types of plasticizers, lubricants, stabilizers, surfactants, colorants, UV absorbers, antistatic agents, driers, crosslinking agents, metal salts, fillers and reinforcements such as various types of fiber.

Applications of the resin composition of the present invention will be described below. When the melt molded article of the fourth invention is in the form of pellets, it can be used like the "resin composition" described in the following explanation and it may be used as a raw material of molded articles.

A resulting resin composition of the present invention is molded through melt molding into various types of molded articles such as films, sheets, containers, pipes and fibers. In particular, films are often produced through a long-time molding and gels and hard spots, which tend to become problems in long-run molding, tend to be apparent as appearance problems. Therefore, films are suitable applications for which the resin composition of the present invention is used.

It is also possible for these molded articles to be pulverized for the purpose of reuse and then be molded again.

Films, sheets, fibers and the like may be uniaxially or biaxially drawn. As a method for melt molding, extrusion molding, inflation extrusion, blow molding, melt spinning, injection molding and the like can be used. The melting temperature, which varies the melting point of the copolymer, is preferably about 150 to about 270° C.

The resin composition of the present invention may be in the form of a molded article composed of a single layer only of the resin composition. However, the resin composition is preferably fabricated into a multilayer structure containing at least one layer comprising the resin composition because the resin composition exhibits a superior interlayer adhesiveness. Examples of the layer constitution of the multilayer structure are not particularly limited, however, include E/T, T/E/T, E/Ad/T, T/Ad/E/Ad/T and the like where the resin composition of the present invention, an adhesive resin and a thermoplastic resin are represented by E, Ad and T, respectively. Each of the layers shown above may be a single layer or, in some cases, may include multiple layers.

The method for producing the multilayer structure is not particularly restricted. Examples are a method in which a thermoplastic resin is melt extruded on a molded article (film, sheet or the like) made of the resin composition of the present invention, a method in which the resin composition and another thermoplastic resin composition are coextruded on a substrate of a thermoplastic resin or the like, a method in which a resin composition composed of a thermoplastic resin and EVOH is coextruded or coinjected, and a method in which a molded article obtained from the resin composition of the present invention and a film or sheet made of another substrate are laminated together using a known adhesive such as organic titanium compound, an isocyanate compound and a polyester compound. Among these, a method of coextrusion or coinjection is preferable.

The method for coextrusion molding the composition of the present invention and a thermoplastic resin is not particularly restricted and examples thereof include the multimanifold-merging T die method, the feedblock-merging T die method and the inflation method. The method of coinjection is not also particularly restricted and conventional methods may be employed.

Examples of the thermoplastic resin to be employed for lamination with the resin composition of the present invention include homopolymers or copolymers of olefins such as linear low-density polyethylene, low-density polyethylene, medium-density polyethylene, high-density polyethylene, ethylene-vinyl acetate copolymer, ethylene-propylene copolymer, polypropylene, propylene-α-olefin copolymer (α-olefins having 4-20 carbon atoms), polybutene and polypentene, polyester such as polyethylene terephthalate, polyester elastomer, polyamide resin such as nylon-6 and nylon-6,6, polystyrene, polyvinyl chloride, polyvinylidene chloride, acrylic resin, vinyl ester resin, polyurethane elastomer, polycarbonate, chlorinated polyethylene and chlorinated polypropylene. Among these, polypropylene, polyethylene, ethylene-propylene copolymer, ethylene-vinyl acetate copolymer, polyamide, polystyrene and polyester are preferably employed.

When the resin composition of the present invention and the thermoplastic resin are laminated, an adhesive resin may be used. As the adhesive resin for such a case is preferably an adhesive resin made of a carboxylic acid-modified polyolefin. By the carboxylic acid-modified polyolefin used herein is meant a modified olefin-based polymer containing carboxyl groups which is obtained by chemically combining an olefin-based polymer with an ethylenically unsaturated carboxylic acid or anhydride thereof (via, for example, addition reaction or graft reaction). The olefin-based polymer used herein includes polyolefin such as polyethylene (low pressure, medium pressure, high pressure), linear low-density polyethylene, polypropylene and polybutene, copolymers of olefin and a comonomer copolymerizable with the olefin (e.g. vinyl ester and unsaturated carboxylic acid ester) such as ethylene-vinyl acetate copolymer and ethylene-ethyl acrylate copolymer. Among these, linear low-density polyethylene, ethylene-vinyl acetate copolymer (having vinyl acetate content of 5 to 55% by weight), ethylene-ethyl acrylate copolymer (having an ethyl acrylate content of 8 to 35% by weight) are preferable. Especially, linear low-density polyethylene and ethylene-vinyl acetate copolymers are preferable. Examples of the ethylenically unsaturated carboxylic acid or anhydride thereof include ethylenically unsaturated monocarboxylic acid and its ester, ethylenically unsaturated dicarboxylic acid, its mono- or diester and its anhydride. Among these, anhydrides of ethylenically unsaturated dicarboxylic acids are preferable. Specific examples are maleic acid, fumaric acid, itaconic acid, maleic anhydride, itaconic anhydride, monomethyl maleate, monoethyl maleate, diethyl maleate and monomethyl fumarate. Above all, maleic anhydride is preferable.

The addition amount or graft amount (degree of modification) of the ethylenically unsaturated carboxylic acid or its anhydride is 0.01 to 15% by weight, and preferably 0.02 to 10% by weight relative to the olefin-based polymer. The addition reaction and the graft reaction of the ethylenically unsaturated carboxylic acid or its anhydride to the olefin-based polymer are conducted, for example, by radical polymerization in the presence of a solvent (e.g. xylene) and a catalyst (e.g. peroxide). The melt flow rate (MFR), measured at 190° C. under a load of 2160 g, of the thus-obtained carboxylic acid-modified polyolefin is preferably 0.2 to 30 g/10 min and more preferably 0.5 to 10 g/10 min. Such adhesive resin may be employed alone or as a mixture of two or more resins.

Thus-obtained coextruded multilayer structure or coinjected multilayer structure is subjected to secondary processing to yield a various types of molded articles (e.g. films, sheets, tubes and bottles). Examples of the molded articles include:
(1) a multilayer co-oriented sheet or film obtained by uniaxial or biaxial orientation of a multilayer structure (e.g. sheet or film) followed optionally by heat treatment;
(2) a multilayer rolled sheet or film obtained by rolling of a multilayer structure (e.g. sheet or film);
(3) a multilayer tray- or cup-shaped container obtained by thermoforming such as vacuum molding, pressure molding and vacuum/pressure molding of a multilayer structure (e.g. sheet or film);
(4) a bottle- or cup-shaped container obtained from a multilayer structure (e.g. a pipe) by stretch blow molding or the like; and
(5) a bottle-shaped container obtained from a multilayer structure (e.g. a parison) by biaxial stretch blow molding or the like.

There are no particular limitations on secondary processing methods and other secondary processing methods than those mentioned above may be adopted. A coextruded multilayer structure or coinjected multilayer structure has both a superior interlayer adhesiveness and a good appearance and odors are inhibited from generating therefrom. Therefore, it can be suitably used as a material for various kinds of food containers, e.g. a material for wrapping films, deep-drawn containers, cup-shaped containers and bottles.

BRIEF DESCRIPTION OF THE DRAWING

FIG. 1 is a graph showing the relation between the ethylene content (ET) and the content (a) of alkali metal salt (A) in Examples 7 to 10.

BEST MODE FOR CARRYING OUT THE INVENTION

The present invention will be described in more detail below with reference to Examples, but the invention is not limited to the Examples. Unless otherwise specifically indicated, "%" and "part" are all by weight. In all cases, ion exchange water was used as water.
(1) Quantitative Determination of Alkali Metal Salt (A)

Dry EVOH pellets were ground by freeze grinding. The resulting ground EVOH was screened through a sieve having a nominal dimension of 1 mm (in accordance with Test Sieve Standard JIS Z 8801). Into a 100-mL Erlenmeyer flask with a ground stopper, 10 g of the screened EVOH powder and 50 mL of 0.01 N aqueous HCl solution were placed. Then a cooling condenser was fitted to the flask and heat extraction was conducted under stirring at 95° C. for 10 hours. 2 mL of the resulting extraction solution was diluted with 8 mL of ion exchange water. The diluted extraction solution was quantitatively analyzed using an ion chromatography IC7000 manufactured by Yokogawa Electric Corporation. Thus, the amounts of Na ion and K ion were determined. For the determination used were calibration curves prepared by use of aqueous sodium chloride solutions and aqueous potassium chloride solutions, respectively. Based on the thus-obtained amounts of Na ion and K ion, the amount of alkali metal salts (A) contained in the dry EVOH pellets was determined in terms of metal elements.

Ion chromatography measurement conditions:
    Column: ICS-C25 manufactured by Yokogawa Electric Corporation.
    Eluant: Aqueous solution containing 5.0 mM of tartaric acid and 1.0 mM of 2,6-pyridinedicarboxylic acid.
    Measuring temperature: 40° C.
    Eluant flow rate: 1 mL/min
    Amount of sample injected: 50 μL
(2) Quantitative Determination of Carboxylate Radical (C1) Extracted Through an Immersion Treatment in Water at 95° C. for 10 Hours Dry EVOH pellets were ground by freeze grinding. The resulting ground EVOH was screened through a sieve having a nominal dimension of 1 mm (in accordance with Test Sieve Standard JIS Z 8801). Into a 100-mL Erlenmeyer flask with a ground stopper, 10 g of the screened EVOH powder and 50 mL of ion exchange water were placed. Then a cooling condenser was fitted to the flask and extraction was conducted under stirring at 95° C. for 10 hours. 2 mL of the resulting extraction solution was diluted with 8 mL of ion exchange water. The diluted extraction solution was quantitatively analyzed using an ion chromatography IC7000 manufactured by Yokogawa Electric Corporation, whereby the amount of carboxylate (acetate) ion was determined. Thus, the amount of carboxylate radical (C1) was obtained. For the quantitative determination, a calibration curve prepared by use of aqueous acetic acid solutions was used.

Ion chromatography measurement conditions:
    Column: SCS5-252 manufactured by Yokogawa Electric Corporation.
    Eluant: 0.1% aqueous phosphoric acid solution
    Measuring temperature: 40° C.
    Eluant flow rate: 1 mL/min
    Amount of sample injected: 50 μL
(3) Quantitative Determination of Carboxylate Radical (C2) Extracted Through Immersion Treatment in a 0.05 N Aqueous Sodium Hydroxide Solution at 95° C. for 10 Hours Dry EVOH pellets were ground by freeze grinding. The resulting ground EVOH was screened through a sieve having a nominal dimension of 1 mm (in accordance with Test Sieve Standard JIS Z 8801). Into a 100-mL Erlenmeyer flask with a ground stopper, 10 g of the screened EVOH powder and 50 mL of 0.05 N aqueous sodium hydroxide solution were placed. Then a cooling condenser was fitted to the flask and heat extraction was conducted under stirring at 95° C. for 10 hours. A sample solution for analysis was prepared by adding 7 mL of ion exchange water to 2 mL of the resulting extraction solution and then further adding 1 mL of 0.1N aqueous phosphoric acid solution. The amount of the carboxylate ion contained in the diluted extraction solution was quantitatively analyzed using an ion chromatography IC7000 manufactured by Yokogawa Electric Corporation, whereby the amount of carboxylate (acetate) ion was determined. Thus, the amount of carboxylate radical (C2) was obtained. For the quantitative determination, used was a calibration curve prepared by use of sample solutions each prepared by adding 7 mL of ion exchange water to 2 mL of a solution obtained by dilution of acetic acid with 0.05 N aqueous sodium hydroxide solution, and further adding 1 mL of 0.1 N aqueous phosphoric acid solution.

Ion chromatography measurement conditions:
 Column: SCS5-252 manufactured by Yokogawa Electric Corporation.
 Eluant: 0.1% aqueous phosphoric acid solution
 Measuring temperature: 40° C.
 Eluant flow rate: 1 mL/min
 Amount of sample injected: 50 μL (4) Quantitative Determination of Boron Compound (B)

50 mg of dry EVOH pellets for use as a sample was completely burned by oxygen-flask combustion technique. The resulting combustion ash was dissolved in 10 mL of 1 mol/L aqueous nitric acid solution. Using this solution, the content of a boron compound (B) in terms of boron element was determined by high-frequency plasma emission spectrochemical analysis (by means of an ICP emission analyzer IRIS AP manufactured by Thermo Jarrell Ash Corporation).

(5) Quantitative Determination of the Content (d) of Phosphoric Acid Compound (D)

In the examples, the content (d1) of a phosphoric acid compound (D) in the pellets before melt molding and the content (d2) of the phosphoric acid compound (D) in a single-layer film after the melt molding were determined.

In the measurement of pellets before melt molding, dry EVOH pellets were ground by freeze grinding first. The resulting ground EVOH was screened through a sieve having a nominal dimension of 1 mm (in accordance with Test Sieve Standard JIS Z 8801). Into a 100-mL Erlenmeyer flask with a ground stopper, 10 g of the screened EVOH powder and 50 mL of 0.01 N aqueous HCl solution were placed. Then a cooling condenser was fitted to the flask and extraction was conducted under stirring at 95° C. for 4 hours. The resulting extraction solution was quantitatively analyzed using an ion chromatography IC7000 manufactured by Yokogawa Electric Corporation, whereby the amount of phosphate ion was determined. Thus, the amount of phosphate radical (d1: μmol/g) was obtained. For the quantitative determination, a calibration curve prepared by use of aqueous sodium dihydrogen phosphate solutions was used.

In the measurement of a single-layer film after melt molding, the measurement was done in the same manner as that for a sample in the form of pellets except using 5 g of strips of the film instead of 10 g of the EVOH powder, whereby the amount of phosphate ion was determined. Thus, the amount of phosphate radical (d2: μmol/g) was obtained.

Ion chromatography measurement conditions:
 Column: ICS-A23 manufactured by Yokogawa Electric Corporation.
 Eluant: Aqueous solution containing 2.5 mM of sodium carbonate and 1.0 mM of sodium hydrogencarbonate.
 Measuring temperature: 40° C.
 Amount of sample injected: 50 mL (6) Phosphorus Element Content (t)

100 mg of single-layer film after melt molding was completely burned by oxygen-flask combustion technique. The resulting combustion ash was dissolved in 10 mL of 1 mol/L aqueous nitric acid solution. Using this solution, the content (t: μmol/g) of a phosphorus element was determined by high-frequency plasma emission spectrochemical analysis (by means of an ICP emission analyzer IRIS AP manufactured by Thermo Jarrell Ash Corporation).

(7) Measurement of Degree of Saponification (NMR Method)

Dry EVOH pellets were ground by freeze grinding. The resulting ground EVOH was screened through a sieve having a nominal dimension of 1 mm (in accordance with Test Sieve Standard JIS Z 8801). An operation cycle composed of immersing 5 g of the screened EVOH powder in 100 g of ion exchange water, after Stirring at 85° C. for 4 hours, dewatering and drying was repeated twice. The resulting washed powdery EVOH was subjected to NMR measurement under the measurement conditions shown below. The degree of saponification was then determined by the analysis method provided below.

Measurement Conditions
 Name of apparatus: JEOL's ultra-conductive NMR, Lambda 500
 Observation frequency: 500 MHz
 Solvent: DMSO-d6
 Polymer concentration: 4% by weight
 Measurement temperature: 40° C. and 95° C.
 Accumulation: 600 times
 Pulse delay time: 3.836 sec
 Sample rotation speed: 10 to 12 Hz
 Pulse width (90° pulse): 6.75 μsec Analysis Method In the measurement at 40° C., a peak of hydrogen in a water molecule appeared near 3.3 ppm. This peak overlapped a 3.1 to 3.7 ppm part of the peak of the methine hydrogen in the vinyl alcohol units of EVOH. On the other hand, in the measurement at 95° C., the overlapping occurred at 40° C. was eliminated, but a peak existing near 4 to 4.5 ppm of the hydrogen in the hydroxyl groups in vinyl alcohol units of EVOH overlapped a 3.7 to 4 ppm part of the peak of the methine hydrogen in vinyl alcohol units of EVOH. In the determination of the quantity of the methine hydrogen (3.1 to 4 ppm) in the vinyl alcohol units of EVOH, data measured at 95° C. were adopted for the region of 3.1 to 3.7 ppm and data measured at 40° C. were adopted for the region of 3.7 to 4 ppm for the purpose of avoidance of overlap with the peaks of the hydrogen of water or a hydroxyl group. Thus, the total amount of the methine hydrogen is determined as the sum of those data. It is known that the peak of hydrogen of water or a hydroxyl group shifts toward higher magnetic fields with increase in measurement temperature.

Therefore, analysis was done by use of both measurements at 40° C. and 95° C. in the following manner. An integral value ($I_1$) of the peaks at a chemical shift of 3.7 to 4 ppm and an integral value ($I_2$) of the peaks at a chemical shift of 0.6 to 1.8 ppm are determined from the spectrum measured at 40° C. An integral value ($I_3$) of the peaks at a chemical shift of 3.1 to 3.7 ppm, an integral value ($I_4$) of the peaks at a chemical shift of 0.6 to 1.8 ppm, and an integral value ($I_5$) of the peaks at a chemical shift of 1.9 to 2.1 ppm are determined from the spectrum measured at 95° C. The peak of a chemical shift of 0.6 to 1.8 ppm derives mainly from methylene hydrogen, whereas the peak of a chemical shift of 1.9 to 2.1 ppm derives from methyl hydrogen in the units of unsaponified vinyl acetate. Based on these integral values, a degree of saponification was calculated according to the following formula:

$$\text{Degree of saponification} = \frac{(I_1/I_2 + I_3/I_4) \times 100}{(I_1/I_2 + I_3/I_4) + (I_5/I_4)/3}$$

(8) Intrinsic Viscosity 0.20 g of dry EVOH pellet for use as a sample was weighed precisely and then dissolved in 40 mL of hydrous phenol (water/phenol=15/85% by weight) by heating at 60° C. for 4 hours. Measurement was conducted (t0=90 sec) at a temperature of 30° C. by means of an Ostwald viscometer and an intrinsic (limiting) viscosity [η] was calculated from the following formula:

$$[\eta] = (2 \times (\eta sp - \ln \eta rel))^{1/2}/C (L/g)$$

ηsp=t/t0−1 (specific viscosity)
ηrel=t/t0 (relative viscosity)
C: EVOH concentration (g/L)
t0: time a blank (hydrous phenol) required to pass the viscometer
t: time hydrous phenol containing a sample dissolved therein required to pass the viscometer (9) Measurement of Water Content of Hydrous EVOH Pellets The water content of EVOH pellets were measured under conditions including a drying temperature of 180° C., a drying time of 20 minutes and a sample weight of about 10 g by means of a halogen moisture analyzer HR73 manufactured by METTLER.

(10) Measurement of Carbon Dioxide Gas Concentration

Using a portable pH and ion meter IM-22P manufactured by DKK-TOA Corp. connected to a carbon dioxide gas sensor (CE-2041), the carbon dioxide gas concentration in a solution was measured.

(11) Single-Layer Film Formation Test

The dry EVOH pellets obtained were subjected to a single-layer film formation under the following conditions using a 20 mm extruder D2020 manufactured by Toyo Seiki Seisaku-Sho, Ltd. (D (mm)=20, L/D=20, compression ratio=2.0, screw:fullflight).
Extrusion temperature:
C1/C2/C3/Die=175/200/220/220° C.
Screw rotation speed: 40 rpm
Discharge rate: 1.3 kg/hr
Drawing roll temperature: 80° C.
Drawing roll speed: 3.1 m/min
Film thickness: 20 μm (11-a) Yellowing Resistance A single-layer film prepared in the method described above was wound up around a paper board tube and it was checked visually for the degree of yellowing at its edge according to the following criteria.
Criterion
A: No yellowing
B: A little yellowing
C: Yellowing (11-b) 72-Hr Long-Run Workability A film passed for 72 hours since the beginning of the single-layer film formation was sampled and the number of gel-like hard spots having a visually recognizable size of about 100 μm or more was counted.

The number of hard spots was converted into a number per 1.0 m² and was judged as follows.
Criterion
 A: Less than 20 hard spots
 B: Not less than 20 but less than 40 hard spots
 C: Not less than 40 but less than 60 hard spots
 D: 60 or more hard spots (11-c) 120-Hr Long-Run Workability A film passed for 120 hours since the beginning of the single-layer film formation was sampled and the number of gel-like hard spots having a visually recognizable size of about 100 μm or more was counted.

The number of hard spots was converted into a number per 1.0 m² and was judged as follows.
Criterion
 A: Less than 20 hard spots
 B: Not less than 20 but less than 40 hard spots
 C: Not less than 40 but less than 60 hard spots
 D: 60 or more hard spots

(12) Evaluation of High-Temperature Yellowing

A 2-mm thick disc-shaped sample was prepared by heat melting 5 g of dry EVOH pellets by a heat compression press machine at 250° C. for 2 minutes. The sample was evaluated visually for its hue.
Criterion
 A: Almost not yellowed.
 B: Slight yellowed.
 C: Yellowed.

(13) Odor Test 10 g of dry EVOH pellets obtained and 10 mL of ion exchange water were put in a 100-mL glass vial, which was sealed with a lid. Then the vial was placed in a safe vent dryer (dryer) at 90° C. and heat extraction was conducted for 15 hours. Subsequently, the vial was left stand at room temperature for 30 minutes to be cooled. After the cooling, the lid of the vial was removed and the resulting extraction solution was evaluated for its odor by five monitors according to the following criteria.
Criterion
 A: No smell.
 B: Slight smell.
 C: Smell

(14) Adhesive Strength Test

Using the dry EVOH pellets obtained, a linear low density polyethylene (LLDPE; manufactured by Mitsui Chemicals, Inc., Ultzex 2022L), and an adhesive resin (Tie; Bondine TX8030 manufactured by Sumika Atochem Co., Ltd.), a three-kind 5-layer multilayer film (LLDPE/Tie/EVOH/Tie/LLDPE=50μ/10μ/10μ/10μ/50μ) was obtained in the method described below.

Specifications of the extruder and the T die used in this test are as follows:
Extruder:
 for EVOH 20φ extruder for laboratory use ME CO-EXT (manufactured by Toyo Seiki Seisaku-Sho Ltd.)
 for Tie 25φ extruder P25-18AC (manufactured by Osaka Seiki)
 for LLDPE 32φ extruder GF-32-A (manufactured by Research Laboratory of Plastics Technology Co., Ltd.)
EVOH extrusion temperature:
 C1/C2/C3/die=175/210/220/220° C.
Tie extrusion temperature:
 C1/C2/C3/die=100/160/220/220° C.
LLDPE extrusion temperature:
 C1/C2/C3/die=150/200/210/220° C.
T die: 300 mm wide coat hunger die (manufactured by Research Laboratory of Plastics Technology Co., Ltd.)

(14-a) Adhesive Strength Just after Film Formation

The multilayer film obtained was cut into a size 150 mm along the MD and 10 mm along the TD just after the multilayer film formation and immediately was subjected to T type peel strength measurement by means of an Autograph (DCS-50M, manufactured by Shimadzu Corp.). In the measurement, the interlayer adhesive strength between the Tie located on the chill roll side and the EVOH in the multilayer film was measured.

(14-b) Adhesive Strength after a Lapse of One Week Since the Film Formation

The above-prepared sample of a multilayer film 150 mm long and 10 mm wide was left stand for one week in a constant temperature and humidity room controlled at 23° C.-50% RH. In the steady temperature and humidity room controlled at 23° C.-50% RH, the T type peel strength measurement was carried out using the foregoing sample. In the measurement, the interlayer adhesive strength between the Tie located on the chill roll side and the EVOH in the multiplayer film was measured.

Example 1

Into a saponification reactor having a capacity of 470 L, 50 kg of a 45% methanol solution of an ethylene-vinyl acetate copolymer having an ethylene content of 32 mol % and 129 kg of methanol were charged and the internal temperature was adjusted to 60° C. while nitrogen gas is blown into the reactor. 29 L of a sodium hydroxide solution (concentration: 80 g/L) in methanol was added thereto and saponification reaction was started. During the saponification reaction, nitrogen gas was blown continuously into the reactor in order to exhaust methyl acetate formed in the reaction system as a by-product out of the reaction system together with the methanol in the reaction system for the purpose of improving the reaction efficiency. The exhaustion rate was about 20 kg/hr in total of methyl acetate and methanol. The exhaust was condensed in a cooling condenser to be recovered. After a lapse of two hours since the start of the reaction, 29 L of a sodium hydroxide solution (concentration: 80 g/L) in methanol was further added to finish up the saponification reaction. After a lapse of six hours since the reaction was started, 6.8 kg of acetic acid and 56 L of water were added to neutralize the reaction solution, thereby stopping the reaction.

The reaction solution neutralized was transferred from the reactor into a drum. It was left stand at room temperature for 16 hours to be cooled and solidified into cake form. Then, the cake-form resin was dewatered by use of a centrifuge (H-130 manufactured by KOKUSAN Corporation, rotation speed 1200 rpm). Subsequently, a step of washing the resin with water by continuously supplying ion exchange water to the central portion of the centrifuge from above and simultaneously dewatering was done for 10 hours. The wash obtained after a lapse of 10 hours since the beginning of the washing had a conductivity of 30 µS/cm (measured by CM-30ET manufactured by DKK-TOA Corporation).

The granular EVOH obtained in this way was dried at 60° C. for 48 hours using a drier. 20 kg of the dried granular EVOH was dissolved in 43 L of water/methanol mixed solution (weight ratio: water/methanol=4/6) at 80° C. for 12 hours under stirring. Then, the stirring was stopped and the temperature in the dissolution vessel was dropped to 65° C. By leaving for five hours, the EVOH solution in water/methanol was degassed. The solution was extruded into a water/methanol mixed solution (weight ratio: water/methanol=9/1) at 5° C. through a metal plate having a circular opening 3.5 mm in diameter to form a strand-like solid, which was cut to yield pellets about 4 mm in diameter and about 5 mm in length.

An operation composed of charging 2.4 kg of the thus obtained water-containing pellets obtained above and 24 L of ion exchange water in a plastic container having a height of 400 mm and an opening diameter of 370 mm, washing at 25° C. for two hours while stirring, and then dewatering was repeated twice. Then, an operation composed of adding 24 L of a 1 g/L aqueous acetic acid solution to 2.4 kg of the water-containing pellets, washing at 25° C. for two hours while stirring and then dewatering was repeated twice. Moreover, an operation composed of adding 24 L of ion exchange water to 2.4 kg of the water-containing pellets, washing at 25° C. for two hours while stirring and then dewatering was repeated six times. The wash obtained after the sixth washing was measured for its conductivity using a CM-30ET manufactured by DKK-TOA Corporation. As a result, the wash had a conductivity of 3 µS/cm. The water content of the resulting EVOH pellets was 50% by weight.

Into a plastic container having a height of 300 mm and an opening diameter of 280 mm, 2.4 kg of the thus obtained water-containing pellets of washed EVOH (ethylene content: 32 mol %, degree of saponification: 99.98 mol % or more (calculated by NMR), intrinsic viscosity: 0.085 L/g) and 5.1 L of an aqueous boric acid solution having a concentration of 0.36 g/L were charged. Then, immersion was done at 25° C. for 10 hours and thereafter the pellets were dewatered.

Next, 5.1 L of ion exchange water was charged into a plastic container having a height of 300 mm and an opening diameter of 280 mm. A silicone tube (inner diameter: 7 mm; outer diameter: 10 mm) was inserted into the ion exchange water contained in the container and carbon dioxide gas was blown thereinto for 0.5 hour by bubbling at a rate of 1 L/min. The carbon dioxide gas was fed by use of a carbon dioxide gas cylinder (30 kg of liquefied carbon dioxide gas manufactured by Nippon Tansan Co., Ltd.) and a flow meter (Model RK-1600R manufactured by Kojima Instruments Inc.). In the water into which carbon dioxide gas was blown, 0.51 g of boric acid and 0.56 g of sodium carbonate were dissolved and blowing of carbon dioxide gas was continued for another one hour at a rate of 1 L/min. In the treatment solution, the content of boric acid was 0.10 g/L and the content of sodium carbonate was 0.11 g/L. The pH of the treatment solution after a 1-hour blowing of carbon dioxide gas was measured using a pH meter (MA235 manufactured by METTLER). The treatment solution had a pH of 5.1.

While the blowing of carbon dioxide gas at a blowing rate of 1 L/min was continued, 2.4 kg of the water-containing pellets were charged into the treatment solution and were subjected to immersion and stirring at 25° C. for six hours. During the period ranging from the beginning of the treatment to the end of the treatment, the pH of the treatment solution was measured at every one-hour interval. The pH of the treatment solution was kept at 5.1 at all measurements with no fluctuations. The carbon dioxide gas concentration in the treatment solution was analyzed to be 20 mmol/L. After a 6-hour immersion and stirring in the treatment solution followed by stirring, the resulting pellets were dewatered immediately and then were subjected to hot-air drying at 80° C. for three hours and successively at 107° C. for 24 hours, yielding dry EVOH pellets (water content: 0.2% by weight).

The alkali metal salt (A) contained in the resulting dry EVOH pellets was sodium and the content of the alkali metal salt (A) was 3.13 µmol/g in terms of metal element. The content of a boron compound (B) in the resulting dry EVOH pellets was 160 ppm (15 µmol/g) in terms of boron element. The amount of the carboxylate radical (C1) extracted through an immersion treatment of the dry EVOH pellets in pure water at 95° C. for 10 hours was 0 ppm (0 µmol/g). The amount of the carboxylate (acetate) radical (C2) extracted through an immersion treatment in a 0.05 N aqueous sodium hydroxide solution at 95° C. for 10 hours was 35 ppm (0.6 µmol/g). The MFR of the dry EVOH pellets was 1.6 g/10 min (at 190° C. under a load of 2160 g).

Using the resulting dry EVOH pellets, a single-layer film was prepared and then test of yellowing resistance and long-run workability were conducted in the procedures described previously. The yellowing resistance, 72-hour long-run workability and 120-hour long-run workability of the EVOH of this example were all evaluated as being A.

Using the resulting dry EVOH pellets, a high-temperature yellowing property test was conducted in the procedure described previously, resulting in rating B. Moreover, using the resulting dry EVOH pellets, an odor test was conducted in the procedure described previously. None of the five monitors perceived a smell and therefore rating A was provided.

Furthermore, using the resulting dry EVOH pellets, an adhesive strength test was conducted in the procedure described previously. The adhesive strength immediately after the film formation was 550 g/15 mm and that after a lapse of one week since the film formation was 800 g/15 mm. In both measurements, favorable adhesive strengths were obtained.

Examples 2 to 6

Preparations of dry EVOH pellets were conducted in the same manner as that in Example 1 except changing, as summarized in Table 1, the composition of the carbon dioxide gas-containing treatment solution in which water-containing EVOH pellets after immersion in an aqueous boric acid solution were immersed. Then, evaluations were also conducted in the same manner as that in Example 1. The compositions of the dry EVOH resin compositions and their evaluations are shown in Table 2 and Table 3, respectively.

Example 7

Into a saponification reactor having a capacity of 470 L, 50 kg of a 45% methanol solution of an ethylene-vinyl acetate copolymer having an ethylene content of 32 mol % and 129 kg of methanol were charged and the internal temperature was adjusted to 60° C. while nitrogen gas is blown into the reactor. 29 L of a sodium hydroxide solution (concentration: 80 g/L) in methanol was added thereto and saponification reaction was started. During the saponification reaction, nitrogen gas was blown continuously into the reactor in order to exhaust methyl acetate formed in the reaction system as a by-product out of the reaction system together with the methanol in the reaction system for the purpose of improving the reaction efficiency. The exhaustion rate was about 20 kg/hr in total of methyl acetate and methanol. The exhaust was condensed in a cooling condenser to be recovered. After a lapse of two hours since the start of the reaction, 29 L of a sodium hydroxide solution (concentration: 80 g/L) in methanol was further added to finish up the saponification reaction. After a lapse of six hours since the reaction was started, 6.8 kg of acetic acid and 56 L of water were added to neutralize the reaction solution, thereby stopping the reaction.

The reaction solution neutralized was transferred from the reactor into a drum. It was left stand at room temperature for 16 hours to be cooled and solidified into cake form. Then, the cake-form resin was dewatered by use of a centrifuge (H-130 manufactured by KOKUSAN Corporation, rotation speed 1200 rpm). Subsequently, a step of washing the resin with water by continuously supplying ion exchange water to the central portion of the centrifuge from above and simultaneously dewatering was done for 10 hours. The wash obtained after a lapse of 10 hours since the beginning of the washing had a conductivity of 30 μS/cm (measured by CM-30ET manufactured by DKK-TOA Corporation).

The granular EVOH obtained in this way was dried at 60° C. for 48 hours using a drier. 20 kg of the dried granular EVOH was dissolved in 43 L of water/methanol mixed solution (weight ratio: water/methanol=4/6) at 80° C. for 12 hours under stirring. Then, the stirring was stopped and the temperature in the dissolution vessel was dropped to 65° C. By leaving for five hours, the EVOH solution in water/methanol was degassed. The solution was extruded into a water/methanol mixed solution (weight ratio: water/methanol=9/1) at 5° C. through a metal plate having a circular opening 3.5 mm in diameter to form a strand-like solid, which was cut to yield pellets about 4 mm in diameter and about 5 mm in length.

An operation composed of charging 2.4 kg of the thus obtained water-containing pellets and 24 L of ion exchange water in a plastic container having a height of 400 mm and an opening diameter of 370 mm, washing at 25° C. for two hours while stirring, and then dewatering was repeated twice. Then, an operation composed of adding 24 L of a 1 g/L aqueous acetic acid solution to 2.4 kg of the water-containing pellets, washing at 25° C. for two hours while stirring and then dewatering was repeated twice. Moreover, an operation composed of adding 24 L of ion exchange water to 2.4 kg of the water-containing pellets, washing at 25° C. for two hours while stirring and then dewatering was repeated six times. The wash obtained after the sixth washing was measured for its conductivity using a CM-30ET manufactured by DKK-TOA Corporation. As a result, the wash had a conductivity of 3 μS/cm. The water content of the resulting EVOH pellets was 50% by weight.

Into a plastic container having a height of 300 mm and an opening diameter of 280 mm, 2.4 kg of the thus obtained water-containing pellets of washed EVOH (ethylene content: 32 mol %, degree of saponification: 99.98 mol % or more (calculated by NMR), intrinsic viscosity: 0.085 L/g) and 5.1 L of an aqueous boric acid solution having a concentration of 0.36 g/L were charged. Then, immersion was done at 25° C. for 10 hours and thereafter the pellets were dewatered.

Next, 24 L of ion exchange water was charged into a plastic container having a height of 400 mm and an opening diameter of 370 mm. A silicone tube (inner diameter: 7 mm; outer diameter: 10 mm) was inserted into the ion exchange water contained in the container and carbon dioxide gas was blown thereinto for 2 hours by bubbling at a rate of 5 L/min, wherein five silicone tubes were used. The carbon dioxide gas was fed by use of a carbon dioxide gas cylinder (30 kg of liquefied carbon dioxide gas manufactured by Nippon Tansan Co., Ltd.) and a flow meter (Model RK-1600R manufactured by Kojima Instruments Inc.). In the water into which carbon dioxide gas was blown, 1.68 g of boric acid, 6.48 g of dipotassium hydrogenphosphate and 1.20 g of phosphoric acid were dissolved and blowing of carbon dioxide gas was continued for another one hour at a rate of 5 L/min. The treatment solution had a boric acid content of 0.07 g/L, a dipotassium hydrogenphosphate content of 0.27 g/L, and a phosphoric acid content of 0.05 g/L. The pH of the treatment solution after a 1-hour blowing of carbon dioxide gas was measured using a pH meter (MA235 manufactured by METTLER). The treatment solution had a pH of 4.9.

While the blowing of carbon dioxide gas at a blowing rate of 5 L/min was continued, 2.4 kg of the water-containing pellets were charged into the treatment solution and were subjected to immersion and stirring at 25° C. for six hours. During the period ranging from the beginning of the treatment to the end of the treatment, the pH of the treatment solution was measured at every one-hour interval. The pH of the treatment solution was kept at 4.9 at all measurements with no fluctuations. The carbon dioxide gas concentration in the treatment solution was analyzed to be 20 mmol/L. After a 6-hour immersion and stirring in the treatment solution followed by stirring, the resulting pellets were dewatered immediately and then were subjected to hot-air drying at 80° C. for three hours and successively at 107° C. for 24 hours, yielding dry EVOH pellets (water content: 0.2% by weight).

The alkali metal salt (A) contained in the resulting dry EVOH pellets was potassium and the content of the alkali metal salt (A) was 3.40 μmol/g in terms of metal element. The content (d1) of the phosphoric acid compound (D) was 1.2

μmol/g in terms of phosphate radical. The content of a boron compound (B) in the resulting dry EVOH pellets was 143 ppm (13 μmol/g) in terms of boron element. The amount of the carboxylate radical (C1) extracted through an immersion treatment of the dry EVOH pellets in pure water at 95° C. for 10 hours was 0 ppm (0 mmol/g). The amount of the carboxylate (acetate) radical (C2) extracted through an immersion treatment in a 0.05 N aqueous sodium hydroxide solution at 95° C. for 10 hours was 36 ppm (0.6 μmol/g). The MFR of the dry EVOH pellets was 1.6 g/10 min (at 190° C. under a load of 2160 g).

Using the resulting dry EVOH pellets, a single-layer film was prepared and then test of yellowing resistance and long-run workability were conducted in the procedures described previously. The yellowing resistance, 72-hour long-run workability and 120-hour long-run workability of the EVOH of this example were all evaluated as being A. The single-layer film had a content (d2) of the phosphoric acid compound (D) of 0.10 μmol/g in terms of phosphate radical and a phosphorus element content (t) of 1.2 μmol/g.

Using the resulting dry EVOH pellets, a high-temperature yellowing property test was conducted in the procedure described previously, resulting in rating A. Moreover, using the resulting dry EVOH pellets, an odor test was conducted in the procedure described previously. None of the five monitors perceived a smell and therefore Rating A was provided.

Furthermore, using the resulting dry EVOH pellets, an adhesive strength test was conducted in the procedure described previously. The adhesive strength immediately after the film formation was 760 g/15 mm and that after a lapse of one week since the film formation was 900 g/15 mm. In both measurements, favorable adhesive strengths were obtained.

Example 8

Into a saponification reactor having a capacity of 470 L, 50 kg of a 45% methanol solution of an ethylene-vinyl acetate copolymer having an ethylene content of 44 mol % and 129 kg of methanol were charged and the internal temperature was adjusted to 60° C. while nitrogen gas is blown into the reactor. 29 L of a sodium hydroxide solution (concentration: 80 g/L) in methanol was added thereto and saponification reaction was started. During the saponification reaction, nitrogen gas was blown continuously into the reactor in order to exhaust methyl acetate formed in the reaction system as a by-product out of the reaction system together with the methanol in the reaction system for the purpose of improving the reaction efficiency. The exhaustion rate was about 20 kg/hr in total of methyl acetate and methanol. The exhaust was condensed in a cooling condenser to be recovered. After a lapse of two hours since the start of the reaction, 29 L of a sodium hydroxide solution (concentration: 80 g/L) in methanol was further added to finish up the saponification reaction. After a lapse of six hours since the reaction was started, 6.8 kg of acetic acid and 45 L of water were added to neutralize the reaction solution, thereby stopping the reaction.

The reaction solution neutralized was transferred from the reactor into a drum. It was left stand at room temperature for 16 hours to be cooled and solidified into cake form. Then, the cake-form resin was dewatered by use of a centrifuge (H-130 manufactured by KOKUSAN Corporation, rotation speed 1200 rpm). Subsequently, a step of washing the resin with water by continuously supplying ion exchange water to the central portion of the centrifuge from above and simultaneously dewatering was done for 10 hours. The wash obtained after a lapse of 10 hours since the beginning of the washing had a conductivity of 30 μS/cm (measured by CM-30ET manufactured by DKK-TOA Corporation).

The granular EVOH obtained in this way was dried at 60° C. for 48 hours using a drier. 20 kg of the dried granular EVOH was dissolved in 48 L of water/methanol mixed solution (weight ratio: water/methanol=2/8) at 80° C. for 12 hours under stirring. Then, the stirring was stopped and the temperature in the dissolution vessel was dropped to 65° C. By leaving for five hours, the EVOH solution in water/methanol was degassed. The solution was extruded into a water/methanol mixed solution (weight ratio: water/methanol=9/1) at 5° C. through a metal plate having a circular opening 3.5 mm in diameter to form a strand-like solid, which was cut to yield pellets about 4 mm in diameter and about 5 mm in length.

An operation composed of charging 2.4 kg of the thus obtained water-containing pellets and 24 L of ion exchange water in a plastic container having a height of 400 mm and an opening diameter of 370 mm, washing at 25° C. for two hours while stirring, and then dewatering was repeated twice. Then, an operation composed of adding 24 L of a 1 g/L aqueous acetic acid solution to 2.4 kg of the water-containing pellets, washing at 25° C. for two hours while stirring and then dewatering was repeated twice. Moreover, an operation composed of adding 24 L of ion exchange water to 2.4 kg of the water-containing pellets, washing at 25° C. for two hours while stirring and then dewatering was repeated six times. The wash obtained after the sixth washing was measured for its conductivity using a CM-30ET manufactured by DKK-TOA Corporation. As a result, the wash had a conductivity of 3 μS/cm. The water content of the resulting EVOH pellets was 50% by weight.

Into a plastic container having a height of 300 mm and an opening diameter of 280 mm, 2.4 kg of the thus obtained water-containing pellets of washed EVOH (ethylene content: 44 mol %, degree of saponification: 99.98 mol % or more (calculated by NMR), intrinsic viscosity: 0.088 L/g) and 5.1 L of an aqueous boric acid solution having a concentration of 0.51 g/L were charged. Then, immersion was done at 25° C. for 10 hours and thereafter the pellets were dewatered.

Next, 24 L of ion exchange water was charged into a plastic container having a height of 400 mm and an opening diameter of 370 mm. A silicone tube (inner diameter: 7 mm; outer diameter: 10 mm) was inserted into the ion exchange water contained in the container and carbon dioxide gas was blown thereinto for 2 hours by bubbling at a rate of 5 L/min, wherein five silicone tubes were used. The carbon dioxide gas was fed by use of a carbon dioxide gas cylinder (30 kg of liquefied carbon dioxide gas manufactured by Nippon Tansan Co., Ltd.) and a flow meter (Model RK-1600R manufactured by Kojima Instruments Inc.). In the water into which carbon dioxide gas was blown, 2.88 g of boric acid, 4.08 g of potassium hydrogencarbonate and 6.17 g of potassium dihydrogenphosphate were dissolved and blowing of carbon dioxide gas was continued for another one hour at a rate of 5 L/min. The treatment solution had a boric acid content of 0.12 g/L, and a potassium hydrogencarbonate of 0.17 g/L, and a potassium dihydrogenphosphate of 0.257 g/L. The pH of the treatment solution after a 1-hour blowing of carbon dioxide gas was measured using a pH meter (MA235 manufactured by METTLER). The treatment solution had a pH of 5.1.

While the blowing of carbon dioxide gas at a blowing rate of 5 L/min was continued, 2.4 kg of the water-containing pellets were charged into the treatment solution and were subjected to immersion and stirring at 25° C. for six hours. During the period ranging from the beginning of the treatment to the end of the treatment, the pH of the treatment solution was measured at every one-hour interval. The pH of the treatment solution was kept at 5.1 at all measurements with no fluctuations. The carbon dioxide gas concentration in the treatment solution was analyzed to be 20 mmol/L. After a 6-hour immersion and stirring in the treatment solution followed by stirring, the resulting pellets were dewatered immediately and then were subjected to hot-air drying at 80° C. for three hours and successively at 107° C. for 24 hours, yielding dry EVOH pellets (water content: 0.2% by weight).

The alkali metal salt (A) contained in the resulting dry EVOH pellets was potassium and the content of the alkali metal salt (A) was 5.4 µmol/g in terms of metal element. The content (d1) of the phosphoric acid compound (D) was 0.5 µmol/g in terms of phosphate radical. The content of a boron compound (B) in the resulting dry EVOH pellets was 242 ppm (22 µmol/g) in terms of boron element. The amount of the carboxylate radical (C1) extracted through an immersion treatment of the dry EVOH pellets in pure water at 95° C. for 10 hours was 0 ppm (0 µmol/g). The amount of the carboxylate (acetate) radical (C2) extracted through an immersion treatment in a 0.05 N aqueous sodium hydroxide solution at 95° C. for 10 hours was 36 ppm (0.6 µmol/g). The MFR of the dry EVOH pellets was 1.6 g/10 min (at 190° C. under a load of 2160 g).

Using the resulting dry EVOH pellets, a single-layer film was prepared and then test of yellowing resistance and long-run workability were conducted in the procedures described previously. The yellowing resistance, 72-hour long-run workability and 120-hour long-run workability of the EVOH of this example were all evaluated as being A. The single-layer film had a content (d2) of the phosphoric acid compound (D) of 0.03 µmol/g in terms of phosphate radical and a phosphorus element content (t) of 0.5 tµmol/g.

Using the resulting dry EVOH pellets, a high-temperature yellowing property test was conducted in the procedure described previously, resulting in rating A. Moreover, using the resulting dry EVOH pellets, an odor test was conducted in the procedure described previously. None of the five monitors perceived a smell and therefore Rating A was provided.

Furthermore, using the resulting dry EVOH pellets, an adhesive strength test was conducted in the procedure described previously. The adhesive strength immediately after the film formation was 760 g/15 mm and that after a lapse of one week since the film formation was 880 g/15 mm. In both measurements, favorable adhesive strengths were obtained.

Example 9

Into a saponification reactor having a capacity of 470 L, 50 kg of a 45% methanol solution of an ethylene-vinyl acetate copolymer having an ethylene content of 27 mol % and 129 kg of methanol were charged and the internal temperature was adjusted to 60° C. while nitrogen gas is blown into the reactor. 29 L of a sodium hydroxide solution (concentration: 80 g/L) in methanol was added thereto and saponification reaction was started. During the saponification reaction, nitrogen gas was blown continuously into the reactor in order to exhaust methyl acetate formed in the reaction system as a by-product out of the reaction system together with the methanol in the reaction system for the purpose of improving the reaction efficiency. The exhaustion rate was about 20 kg/hr in total of methyl acetate and methanol. The exhaust was condensed in a cooling condenser to be recovered. After a lapse of two hours since the start of the reaction, 29 L of a sodium hydroxide solution (concentration: 80 g/L) in methanol was further added to finish up the saponification reaction. After a lapse of six hours since the reaction was started, 6.8 kg of acetic acid and 56 L of water were added to neutralize the reaction solution, thereby stopping the reaction.

The reaction solution neutralized was transferred from the reactor into a drum. It was left stand at room temperature for 16 hours to be cooled and solidified into cake form. Then, the cake-form resin was dewatered by use of a centrifuge (H-130 manufactured by KOKUSAN Corporation, rotation speed 1200 rpm). Subsequently, a step of washing the resin with water by continuously supplying ion exchange water to the central portion of the centrifuge from above and simultaneously dewatering was done for 10 hours. The wash obtained after a lapse of 10 hours since the beginning of the washing had a conductivity of 30 µS/cm (measured by CM-30ET manufactured by DKK-TOA Corporation).

The granular EVOH obtained in this way was dried at 60° C. for 48 hours using a drier. 20 kg of the dried granular EVOH was dissolved in 43 L of water/methanol mixed solution (weight ratio: water/methanol=5/5) at 80° C. for 12 hours under stirring. Then, the stirring was stopped and the temperature in the dissolution vessel was dropped to 65° C. By leaving for five hours, the EVOH solution in water/methanol was degassed. The solution was extruded into a water/methanol mixed solution (weight ratio: water/methanol=9/1) at 5° C. through a metal plate having a circular opening 3.5 mm in diameter to form a strand-like solid, which was cut to yield pellets about 4 mm in diameter and about 5 mm in length.

An operation composed of charging 2.4 kg of the thus obtained water-containing pellets and 24 L of ion exchange water in a plastic container having a height of 400 mm and an opening diameter of 370 mm, washing at 25° C. for two hours while stirring, and then dewatering was repeated twice. Then, an operation composed of adding 24 L of a 1 g/L aqueous acetic acid solution to 2.4 kg of the water-containing pellets, washing at 25° C. for two hours while stirring and then dewatering was repeated twice. Moreover, an operation composed of adding 24 L of ion exchange water to 2.4 kg of the water-containing pellets, washing at 25° C. for two hours while stirring and then dewatering was repeated six times. The wash obtained after the sixth washing was measured for its conductivity using a CM-30ET manufactured by DKK-TOA Corporation. As a result, the wash had a conductivity of 3 µS/cm. The water content of the resulting EVOH pellets was 50% by weight.

Into a plastic container having a height of 300 mm and an opening diameter of 280 mm, 2.4 kg of the thus obtained water-containing pellets of washed EVOH (ethylene content: 27 mol %, degree of saponification: 99.98 mol % or more (calculated by NMR), intrinsic viscosity: 0.094 L/g) and 5 L of an aqueous boric acid solution having a concentration of 0.30 g/L were charged. Then, immersion was done at 25° C. for 10 hours and thereafter the pellets were dewatered.

Next, 5 L of ion exchange water was charged into a plastic container having a height of 300 mm and an opening diameter of 280 mm. A silicone tube (inner diameter: 7 mm; outer diameter: 10 mm) was inserted into the ion exchange water contained in the container and carbon dioxide gas was blown thereinto for 0.5 hour by bubbling at a rate of 1 L/min. The carbon dioxide gas was fed by use of a carbon dioxide gas cylinder (30 kg of liquefied carbon dioxide gas manufactured by Nippon Tansan Co., Ltd.) and a flow meter (Model RK-1600R manufactured by Kojima Instruments Inc.). In the water into which carbon dioxide gas was blown, 0.35 g of boric acid, 0.65 g of potassium hydrogencarbonate and 0.85 g of potassium dihydrogenphosphate were dissolved and blowing of carbon dioxide gas was continued for another one hour at a rate of 1 L/min. The treatment solution had a boric acid content of 0.07 g/L, a potassium hydrogencarbonate content of 0.13 g/L, and a potassium dihydrogenphosphate content of 0.17 g/L. The pH of the treatment solution after a 1-hour blowing of carbon dioxide gas was measured using a pH meter (MA235 manufactured by METTLER). The treatment solution had a pH of 5.0.

While the blowing of carbon dioxide gas at a blowing rate of 1 L/min was continued, 2.4 kg of the water-containing pellets were charged into the treatment solution and were subjected to immersion and stirring at 25° C. for six hours. During the period ranging from the beginning of the treatment to the end of the treatment, the pH of the treatment solution was measured at every one-hour interval. The pH of the treatment solution was kept at 5 at all measurements with no fluctuations. The carbon dioxide gas concentration in the treatment solution was analyzed to be 20 mmol/L. After a 6-hour immersion and stirring in the treatment solution followed by stirring, the resulting pellets were dewatered immediately and then were subjected to hot-air drying at 80° C. for three hours and successively at 107° C. for 24 hours, yielding dry EVOH pellets (water content: 0.2% by weight).

The alkali metal salt (A) contained in the resulting dry EVOH pellets was potassium and the content of the alkali metal salt (A) was 2.6 µmol/g in terms of metal element. The content (d1) of phosphoric acid compound (D) was 0.4 µmol/g in terms of phosphate radical.

The content of a boron compound (B) in the resulting dry EVOH pellets was 160 ppm (15 µmol/g) in terms of boron element. The amount of the carboxylate radical (C1) extracted through an immersion treatment of the dry EVOH pellets in pure water at 95° C. for 10 hours was 0 ppm (0 µmol/g). The amount of the carboxylate (acetate) radical (C2) extracted through an immersion treatment in a 0.05 N aqueous sodium hydroxide solution at 95° C. for 10 hours was 35 ppm (0.6 µmol/g). The MFR of the dry EVOH pellets was 4.0 g/10 min (at 210° C. under a load of 2160 g).

Using the resulting dry EVOH pellets, a single-layer film was prepared and then test of yellowing resistance and long-run workability were conducted in the procedures described previously. The yellowing resistance, the 72-hour long-run workability and the 120-hour long-run workability of the EVOH of this example were evaluated as being B, A and B, respectively. The single-layer film had a content (d2) of the phosphoric acid compound (D) of 0.02 µmol/g in terms of phosphate radical and a phosphorus element content (t) of 0.4 µmol/g.

Using the resulting dry EVOH pellets, a high-temperature yellowing property test was conducted in the procedure described previously, resulting in rating B. Moreover, using the resulting dry EVOH pellets, an odor test was conducted in the procedure described previously. None of the five monitors perceived a smell and therefore Rating A was provided.

Furthermore, using the resulting dry EVOH pellets, an adhesive strength test was conducted in the procedure described previously. The adhesive strength immediately after the film formation was 800 g/15 mm and that after a lapse of one week since the film formation was 950 g/15 mm. In both measurements, favorable adhesive strengths were obtained.

Example 10

Into a saponification reactor having a capacity of 470 L, 50 kg of a 45% methanol solution of an ethylene-vinyl acetate copolymer having an ethylene content of 47 mol % and 129 kg of methanol were charged and the internal temperature was adjusted to 60° C. while nitrogen gas is blown into the reactor. 29 L of a sodium hydroxide solution (concentration: 80 g/L) in methanol was added thereto and saponification reaction was started. During the saponification reaction, nitrogen gas was blown continuously into the reactor in order to exhaust methyl acetate formed in the reaction system as a by-product out of the reaction system together with the methanol in the reaction system for the purpose of improving the reaction efficiency. The exhaustion rate was about 20 kg/hr in total of methyl acetate and methanol. The exhaust was condensed in a cooling condenser to be recovered. After a lapse of two hours since the start of the reaction, 29 L of a sodium hydroxide solution (concentration: 80 g/L) in methanol was further added to finish up the saponification reaction. After a lapse of six hours since the reaction was started, 6.8 kg of acetic acid and 45 L of water were added to neutralize the reaction solution, thereby stopping the reaction.

The reaction solution neutralized was transferred from the reactor into a drum. It was left stand at room temperature for 16 hours to be cooled and solidified into cake form. Then, the cake-form resin was dewatered by use of a centrifuge (H-130 manufactured by KOKUSAN Corporation, rotation speed 1200 rpm). Subsequently, a step of washing the resin with water by continuously supplying ion exchange water to the central portion of the centrifuge from above and simultaneously dewatering was done for 10 hours. The wash obtained after a lapse of 10 hours since the beginning of the washing had a conductivity of 30 µS/cm (measured by CM-30ET manufactured by DKK-TOA Corporation).

The granular EVOH obtained in this way was dried at 60° C. for 48 hours using a drier. 20 kg of the dried granular EVOH was dissolved in 43 L of water/methanol mixed solution (weight ratio: water/methanol=2/8) at 80° C. for 12 hours under stirring. Then, the stirring was stopped and the temperature in the dissolution vessel was dropped to 65° C. By leaving for five hours, the EVOH solution in water/methanol was degassed. The solution was extruded into a water/methanol mixed solution (weight ratio: water/methanol=9/1) at 5° C. through a metal plate having a circular opening 3.5 mm in diameter to form a strand-like solid, which was cut to yield pellets about 4 mm in diameter and about 5 mm in length.

An operation composed of charging 2.4 kg of the thus obtained water-containing pellets and 24 L of ion exchange water in a plastic container having a height of 400 mm and an opening diameter of 370 mm, washing at 25° C. for two hours while stirring, and then dewatering was repeated twice. Then, an operation composed of adding 24 L of a 1 g/L aqueous acetic acid solution to 2.4 kg of the water-containing pellets, washing at 25° C. for two hours while stirring and then dewatering was repeated twice. Moreover, an operation composed of adding 24 L of ion exchange water to 2.4 kg of the water-containing pellets, washing at 25° C. for two hours while stirring and then dewatering was repeated six times. The wash obtained after the sixth washing was measured for its conductivity using a CM-30ET manufactured by DKK-TOA Corporation. As a result, the wash had a conductivity of 3 µS/cm. The water content of the resulting EVOH pellets was 50% by weight.

Into a plastic container having a height of 300 mm and an opening diameter of 280 mm, 2.4 kg of the thus obtained water-containing pellets of washed EVOH (ethylene content: 47 mol %, degree of saponification: 99.98 mol % or more (calculated by NMR), intrinsic viscosity: 0.082 L/g) and 5 L of an aqueous boric acid solution having a concentration of 0.21 g/L were charged. Then, immersion was done at 25° C. for 10 hours and thereafter the pellets were dewatered.

Next, 5 L of ion exchange water was charged into a plastic container having a height of 300 mm and an opening diameter of 280 mm. A silicone tube (inner diameter: 7 mm; outer diameter: 10 mm) was inserted into the ion exchange water contained in the container and carbon dioxide gas was blown thereinto for 0.5 hour by bubbling at a rate of 1 L/min. The carbon dioxide gas was fed by use of a carbon dioxide gas cylinder (30 kg of liquefied carbon dioxide gas manufactured by Nippon Tansan Co., Ltd.) and a flow meter (Model RK-1600R manufactured by Kojima Instruments Inc.). In the water into which carbon dioxide gas was blown, 0.20 g of boric acid, 1.15 g of potassium hydrogencarbonate and 0.55 g of potassium dihydrogenphosphate were dissolved and blowing of carbon dioxide gas was continued for another one hour at a rate of 1 L/min. The treatment solution had a boric acid content of 0.04 g/L, a potassium hydrogencarbonate content of 0.23 g/L, and a potassium dihydrogenphosphate content of 0.11 g/L.

The pH of the treatment solution after a 1-hour blowing of carbon dioxide gas was measured using a pH meter (MA235 manufactured by METTLER). The treatment solution had a pH of 5.2.

While the blowing of carbon dioxide gas at a blowing rate of 1 L/min was continued, 2.4 kg of the water-containing pellets were charged into the treatment solution and were subjected to immersion and stirring at 25° C. for six hours. During the period ranging from the beginning of the treatment to the end of the treatment, the pH of the treatment solution was measured at every one-hour interval. The pH of the treatment solution was kept at 5.2 at all measurements with no fluctuations. The carbon dioxide gas concentration in the treatment solution was analyzed to be 20 mmol/L. After a 6-hour immersion and stirring in the treatment solution followed by stirring, the resulting pellets were dewatered immediately and then were subjected to hot-air drying at 80° C. for three hours and successively at 107° C. for 24 hours, yielding dry EVOH pellets (water content: 0.2% by weight).

The alkali metal salt (A) contained in the resulting dry EVOH pellets was potassium and the content of the alkali metal salt (A) was 5.6 µmol/g in terms of metal element. The content (d1) of phosphoric acid compound (D) was 0.5 µmol/g in terms of phosphate radical.

The content of a boron compound (B) in the resulting dry EVOH pellets was 110 ppm (10 µmol/g) in terms of boron element. The amount of the carboxylate radical (C1) extracted through an immersion treatment of the dry EVOH pellets in pure water at 95° C. for 10 hours was 0 ppm (0 µmol/g). The amount of the carboxylate (acetate) radical (C2) extracted through an immersion treatment in a 0.05 N aqueous sodium hydroxide solution at 95° C. for 10 hours was 35 ppm (0.6 µmol/g). The MFR of the dry EVOH pellets was 6.2 g/10 min (at 190° C. under a load of 2160 g).

Using the resulting dry EVOH pellets, a single-layer film was prepared and then test of yellowing resistance and long-run workability were conducted in the procedures described previously. The yellowing resistance, 72-hour long-run workability and 120-hour long-run workability of the EVOH of this example were all evaluated as being A. The single-layer film had a content (d2) of the phosphoric acid compound (D) of 0.03 µmol/g in terms of phosphate radical and a phosphorus element content (t) of 0.5 µmol/g.

Using the resulting dry EVOH pellets, a high-temperature yellowing property test was conducted in the procedure described previously, resulting in rating A. Moreover, using the resulting dry EVOH pellets, an odor test was conducted in the procedure described previously. None of the five monitors perceived a smell and therefore rating A was provided.

Furthermore, using the resulting dry EVOH pellets, an adhesive strength test was conducted in the procedure described previously. The adhesive strength immediately after the film formation was 700 g/15 mm and that after a lapse of one week since the film formation was 880 g/15 mm. In both measurements, favorable adhesive strengths were obtained.

Comparative Example 1

Into a plastic container having a height of 300 mm and an opening diameter of 280 mm, 2.4 kg of the water-containing pellets obtained resulting from washing in the same manner as that in Example 1 and 5.1 L of an aqueous boric acid solution having a concentration of 0.36 g/L were charged. Then, immersion was done at 25° C. for 10 hours and thereafter the pellets were dewatered.

Subsequently, the water-containing pellets resulting from the dewatering were immersed and stirred in 5.1 L of an aqueous solution containing 0.56 g/L of acetic acid and 0.025 g/L of sodium acetate at 25° C. for six hours. Thereafter the pellets were dewatered and then were subjected to hot-air drying at 80° C. for three hours and successively at 107° C. for 24 hours, yielding dry EVOH pellets (water content: 0.2% by weight). Using the resulting dry pellets obtained, evaluations were conducted in the same manners as those in Example 1. The composition of the dry EVOH resin composition and its evaluations are shown in Table 2 and Table 3, respectively.

Comparative Example 2

Dry EVOH pellets were prepared in the same manner as that in Comparative Example 1 except changing, as shown in Table 1, the composition of the treatment solution in which the water-containing pellets resulting from the washing are immersed. Using the dry pellets obtained, evaluations were conducted in the same manners as those in Example 1. The composition of the dry EVOH resin composition and its evaluations are shown in Table 2 and Table 3, respectively.

Comparative Example 3

Water-containing EVOH pellets (water content 50% by weight) which had an ethylene content of 32 mol %, a degree of saponification of 99.6 mol % (calculated by NMR) and an intrinsic viscosity of 0.085 L/g and which contained a saponification catalyst residue were washed in the same manner as that in Comparative Example 1.

Dry EVOH pellets were prepared in the same manner as that in Comparative Example 1 except using, as water-containing pellets, those prepared above and changing, as shown in Table 1, the composition of the solution in which the water-containing pellets obtained are immersed. Using the dry pellets obtained, evaluations were conducted in the same manners as those in Example 1. The composition of the dry EVOH resin composition and its evaluations are shown in Table 2 and Table 3, respectively.

Comparative Example 4

Dry EVOH pellets were prepared in the same manner as that in Comparative Example 1 except changing, as shown in Table 1, the composition of the treatment solution in which the water-containing pellets resulting from the washing are immersed. Using the dry pellets obtained, evaluations were conducted in the same manners as those in Example 1. The composition of the dry EVOH resin composition and its evaluations are shown in Table 2 and Table 3, respectively.

TABLE 1

Prescription of Treatment Solution

| | Bubbling of carbon dioxide gas | Acetic acid (g/L) | Sodium carbonate (g/L) | Potassium carbonate (g/L) | Potassium hydrogencarbonate (g/L) | Dipotassium hydrogenphosphate (g/L) |
|---|---|---|---|---|---|---|
| Example 1 | Bubbled | 0 | 0.110 | 0 | 0 | 0 |
| Example 2 | Bubbled | 0 | 0 | 0.140 | 0 | 0 |
| Example 3 | Bubbled | 0 | 0.016 | 0 | 0 | 0 |
| Example 4 | Bubbled | 0 | 0 | 0.020 | 0 | 0 |
| Example 5 | Bubbled | 0 | 0.240 | 0 | 0 | 0 |
| Example 6 | Bubbled | 0 | 0 | 0.310 | 0 | 0 |
| Example 7 | Bubbled | 0 | 0 | 0 | 0 | 0.270 |
| Example 8 | Bubbled | 0 | 0 | 0 | 0.170 | 0 |
| Example 9 | Bubbled | 0 | 0 | 0 | 0.130 | 0 |
| Example 10 | Bubbled | 0 | 0 | 0 | 0.230 | 0 |
| Comparative Example 1 | Not bubbled | 0.560 | 0 | 0 | 0 | 0 |
| Comparative Example 2 | Not bubbled | 0.560 | 0 | 0 | 0 | 0 |
| Comparative Example 3 | Not bubbled | 0.200 | 0 | 0 | 0 | 0 |
| Comparative Example 4 | Not bubbled | 0.500 | 0 | 0 | 0 | 0.270 |

| | potassium dihydrogen phosphate | Phosphoric acid (g/L) | Sodium acetate (g/L) | Boric acid ($H_3BO_3$) (g/L) | pH |
|---|---|---|---|---|---|
| Example 1 | 0 | 0 | 0 | 0.10 | 5.1 |
| Example 2 | 0 | 0 | 0 | 0.10 | 4.7 |
| Example 3 | 0 | 0 | 0 | 0.10 | 4.7 |
| Example 4 | 0 | 0 | 0 | 0.10 | 4.2 |
| Example 5 | 0 | 0 | 0 | 0.10 | 5.4 |
| Example 6 | 0 | 0 | 0 | 0.10 | 5.3 |
| Example 7 | 0 | 0.050 | 0 | 0.07 | 4.9 |
| Example 8 | 0.257 | 0 | 0 | 0.12 | 5.1 |
| Example 9 | 0.170 | 0 | 0 | 0.07 | 5.0 |
| Example 10 | 0.110 | 0 | 0 | 0.04 | 5.2 |
| Comparative Example 1 | 0 | 0 | 0.025 | 0.10 | Not measured |
| Comparative Example 2 | 0 | 0 | 0.700 | 0.10 | Not measured |
| Comparative Example 3 | 0 | 0 | 0.800 | 0.10 | Not measured |
| Comparative Example 4 | 0 | 0.050 | 0 | 0.07 | Not measured |

TABLE 2

Composition of EVOH Resin Composition

| | EVOH | | Analysis results of pellets before melt-molding | | | |
|---|---|---|---|---|---|---|
| | Ethylene content (ET) (mol %) | Degree of saponification (mol %) | Alkali metal salt (a: sodium) (μmol/g) | Alkali metal salt (a: potassium) (μmol/g) | Boron compound (B) (μmol/g) | Carboxylate radical (C1) (μmol/g) |
| Example 1 | 32 | 99.98 or more | 3.1 | 0 | 15 | 0 |
| Example 2 | 32 | 99.98 or more | 0 | 3.0 | 15 | 0 |
| Example 3 | 32 | 99.98 or more | 0.6 | 0 | 15 | 0 |
| Example 4 | 32 | 99.98 or more | 0 | 0.5 | 15 | 0 |
| Example 5 | 32 | 99.98 or more | 6.0 | 0 | 15 | 0 |

TABLE 2-continued

| | | Composition of EVOH Resin Composition | | | | |
|---|---|---|---|---|---|---|
| Example 6 | 32 | 99.98 or more | 0 | 5.8 | 15 | 0 |
| Example 7 | 32 | 99.98 or more | 0 | 3.4 | 13 | 0 |
| Example 8 | 44 | 99.98 or more | 0 | 5.4 | 22 | 0 |
| Example 9 | 27 | 99.98 or more | 0 | 2.6 | 15 | 0 |
| Example 10 | 47 | 99.98 or more | 0 | 5.6 | 10 | 0 |
| Comparative Example 1 | 32 | 99.98 or more | 0.3 | 0 | 15 | 6.8 |
| Comparative Example 2 | 32 | 99.98 or more | 5.8 | 0 | 15 | 6.9 |
| Comparative Example 3 | 32 | 99.6 | 8.0 | 0 | 15 | 9.0 |
| Comparative Example 4 | 32 | 99.98 or more | 0 | 3.1 | 13 | 6.9 |

| | Analysis results of pellets before melt-molding | | | Analysis results of single-layer film | | |
|---|---|---|---|---|---|---|
| | Carboxylate radical (C2) (μmol/g) | Phosphoric acid compound (d1) (μmol/g) | Ratio a/d1 | Phosphoric acid compound (d2) (μmol/g) | Phosphorus element content (t) (μmol/g) | Ratio d2/t |
| Example 1 | 0.6 | 0 | — | — | — | — |
| Example 2 | 0.6 | 0 | — | — | — | — |
| Example 3 | 0.6 | 0 | — | — | — | — |
| Example 4 | 0.6 | 0 | — | — | — | — |
| Example 5 | 0.6 | 0 | — | — | — | — |
| Example 6 | 0.6 | 0 | — | — | — | — |
| Example 7 | 0.6 | 1.2 | 2.8 | 0.10 | 1.2 | 0.08 |
| Example 8 | 0.6 | 0.5 | 10.8 | 0.03 | 0.5 | 0.06 |
| Example 9 | 0.6 | 0.4 | 6.5 | 0.02 | 0.4 | 0.05 |
| Example 10 | 0.6 | 0.5 | 11.2 | 0.03 | 0.5 | 0.06 |
| Comparative Example 1 | 7.6 | 0 | — | — | — | — |
| Comparative Example 2 | 7.7 | 0 | — | — | — | — |
| Comparative Example 3 | 60.9 | 0 | — | — | — | — |
| Comparative Example 4 | 7.7 | 1.0 | 3.1 | 0.95 | 1.0 | 0.95 |

TABLE 3

| | Evaluations | | | | | | |
|---|---|---|---|---|---|---|---|
| | Interlayer adhesion strength (g/15 mm) | | Single-layer film formation test | | | | |
| | Just after film formation | After one week | Yellowing resistance | Long-run workability (72 hr) | Long-run workability (120 hr) | High-temperature yellowing | Odor |
| Example 1 | 550 | 800 | A | A | A | B | A |
| Example 2 | 675 | 870 | A | A | A | B | A |
| Example 3 | 240 | 565 | A | A | B | B | A |
| Example 4 | 280 | 650 | A | A | A | B | A |
| Example 5 | 500 | 730 | A | A | B | B | A |
| Example 6 | 750 | 890 | A | A | A | B | A |
| Example 7 | 760 | 900 | A | A | A | A | A |
| Example 8 | 760 | 880 | A | A | A | A | A |
| Example 9 | 800 | 950 | B | A | B | B | A |
| Example 10 | 700 | 880 | A | A | A | A | A |
| Comparative Example 1 | 100 | 355 | A | D | D | B | C |
| Comparative Example 2 | 480 | 760 | A | B | C | B | C |
| Comparative Example 3 | 440 | 725 | A | C | D | C | C |

TABLE 3-continued

| | Evaluations | | | | | | |
|---|---|---|---|---|---|---|---|
| | Interlayer adhesion strength (g/15 mm) | | | Single-layer film formation test | | | |
| | Just after film formation | After one week | Yellowing resistance | Long-run workability (72 hr) | Long-run workability (120 hr) | High-temperature yellowing | Odor |
| Comparative Example 4 | 450 | 760 | A | C | D | A | C |

In Examples 7 to 10, EVOHs varying in ethylene content from 27 mol % to 47 mol % were used. Our past experiences have revealed that it is preferable that the content of an alkali metal content (A) get greater with increase of the ethylene content. Regarding the contents of the alkali metals (A) in Examples 7 to 10, an alkali metal salt (A) was incorporated in an amount which seemed to be optimum for each ethylene content based on such knowledge.

FIG. 1 is a graph showing the relation between the ethylene content (ET) and the content (a) of alkali metal salt (A) in Examples 7 to 10. An approximate curve was obtained by exponential approximation from the four data plotted. Thus, an approximate formula "a=0.95×exp(0.039×ET)" was obtained. It is desirable to use an alkali metal salt (A) within the range of ±2 μmol/g relative to the formula.

INDUSTRIAL APPLICABILITY

As described above, the method for producing an EVOH resin composition and the method for producing EVOH resin composition pellets of the present invention are environmentally friendly production methods in which no carboxylic acid such as acetic acid is released. Moreover, the EVOH resin composition and EVOH resin composition pellets of the present invention generate less odor and are superior in long-run workability during melt-molding. Therefore, they can provide melt-molded articles of good qualities.

The invention claimed is:

1. An ethylene-vinyl alcohol copolymer resin composition, comprising:
an ethylene-vinyl alcohol copolymer resin, and
an alkali metal salt (A),
wherein
a content of alkali metal in the ethylene-vinyl alcohol copolymer resin composition is from 0.1 to 20 μmol/g,
a content of a carboxylate radical (C1) of 0 to 2 μmol/g which is obtained when the ethylene-vinyl alcohol copolymer resin is extracted through an immersion treatment in water at 95° C. for 10 hours, and
a content of a carboxylate radical (C2) of 0 to 20 μmol/g which is obtained when the ethylene-vinyl alcohol copolymer resin is extracted through an immersion treatment in a 0.05 N aqueous sodium hydroxide solution at 95° C. for 10 hours.

2. The ethylene-vinyl alcohol copolymer resin composition according to claim 1, wherein a degree of saponification of the ethylene-vinyl alcohol copolymer resin is 99.9 to 100 mol %.

3. The ethylene-vinyl alcohol copolymer resin composition according to claim 1, wherein an ethylene content of the ethylene-vinyl alcohol copolymer resin is 5 to 60 mol %.

4. The ethylene-vinyl alcohol copolymer resin composition according to claim 1, wherein the alkali metal salt (A) is a potassium salt.

5. The ethylene-vinyl alcohol copolymer resin composition according to claim 1, wherein
a is the alkali metal content (μmol/g) of the ethylene-vinyl alcohol copolymer resin composition and is described by formula (1):

$$0.95 \times \exp(0.039 \times ET) - 2 \leq a \leq 0.95 \times \exp(0.039 \times ET) + 2 \quad (1)$$

wherein ET is the ethylene content (mol %) of the ethylene-vinyl alcohol copolymer resin.

6. The ethylene-vinyl alcohol copolymer resin composition according to claim 1, further comprising a boron compound (B), wherein a content of boron in the ethylene-vinyl alcohol copolymer resin composition is from 1 to 200 μmol/g.

7. The ethylene-vinyl alcohol copolymer resin composition according to claim 1, further comprising a phosphoric acid compound (D), wherein a phosphate content of the ethylene-vinyl alcohol copolymer resin composition is from 0.05 to 5 μmol/g.

8. The ethylene-vinyl alcohol copolymer resin composition according to claim 7, wherein a ratio (a/d) of a content (a: μmol/g) of the alkali metal to a content (d: μmol/g) of phosphate in the ethylene-vinyl alcohol copolymer resin composition is from 2.4 to 50.

9. A pellet comprising the ethylene-vinyl alcohol copolymer resin composition according to claim 1.

10. A film comprising the ethylene-vinyl alcohol copolymer resin composition according to claim 1.

11. A multilayer structure comprising at least one layer comprising the ethylene-vinyl alcohol copolymer resin composition according to claim 1.

* * * * *